United States Patent
Ichapurapu et al.

(10) Patent No.: US 12,257,496 B1
(45) Date of Patent: Mar. 25, 2025

(54) TECHNIQUES FOR CONSERVING POWER ON A DEVICE

(71) Applicant: Amazon Technologies, Inc., Seattle, WA (US)

(72) Inventors: Ravi Ichapurapu, Morgan Hill, CA (US); Sameet Ramakrishnan, Saratoga, CA (US); Evan Fletcher Dougal, Mountain View, CA (US); Brian Fisher, Lake Forest, CA (US); Junwu Luo, Milpitas, CA (US); Sean Hajizadeh, Mission Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/665,911

(22) Filed: Feb. 7, 2022

Related U.S. Application Data

(63) Continuation of application No. 16/415,224, filed on May 17, 2019, now Pat. No. 11,241,616.

(51) Int. Cl.
  *A63F 13/24* (2014.01)
  *A63F 13/235* (2014.01)
  *G06F 1/3287* (2019.01)

(52) U.S. Cl.
  CPC ............ *A63F 13/24* (2014.09); *A63F 13/235* (2014.09); *G06F 1/3287* (2013.01)

(58) Field of Classification Search
  CPC ........... A63F 13/24; G06F 1/3287; G06F 1/32
  USPC .......................................................... 463/37
  See application file for complete search history.

(56) References Cited

U.S. PATENT DOCUMENTS

| | | | |
|---|---|---|---|
| 11,241,616 B1* | 2/2022 | Ichapurapu | G06F 3/038 |
| 2008/0057894 A1 | 3/2008 | Aleksic et al. | |
| 2008/0123582 A1 | 5/2008 | Maekawa | |
| 2008/0130603 A1* | 6/2008 | Wentink | H04W 52/0206 |
| | | | 455/41.2 |
| 2008/0171568 A1 | 7/2008 | Choi et al. | |
| 2012/0078397 A1 | 3/2012 | Lee et al. | |
| 2013/0159567 A1 | 6/2013 | Gallagher et al. | |

(Continued)

OTHER PUBLICATIONS dot11zen, "802.11 Power Management with Packet capture examples", Feb. 12, 2018, retrieved from Internet on 11/17120 from URL <https://dot11zen.blogspot.com/2018/02/80211-power-management-with-packet.html >.

(Continued)

*Primary Examiner* — Ryan Hsu
(74) *Attorney, Agent, or Firm* — Lee & Hayes, P.C.

(57) ABSTRACT

This disclosure describes, in part, techniques for conserving power on an electronic device. For instance, at given time intervals, the electronic device may be sending input data to a network device and receiving audio data from the network device. The electronic device may then use one or more techniques to determine when to switch from operating in a first mode, where the electronic device sends and/or receives the data, to operating in a second mode, where the electronic device ceases sending and/or receiving the data. For example, the electronic device may make the determination based on an amount of data stored in a buffer, whether the electronic device receives data, using data received from the network device, and/or the like. Based on the determination, the electronic device may switch to the second mode in order to conserve power.

20 Claims, 10 Drawing Sheets

(56) References Cited

U.S. PATENT DOCUMENTS

| | | |
|---|---|---|
| 2013/0201918 A1 | 8/2013 | Hirakawa et al. |
| 2014/0221097 A1* | 8/2014 | Plagge ................ G06F 1/3259 463/36 |
| 2017/0060645 A1* | 3/2017 | Gasselin De Richebourg ............ G06F 9/54 |
| 2018/0084558 A1 | 3/2018 | Chen et al. |
| 2018/0176864 A1 | 6/2018 | Vasishtha et al. |

OTHER PUBLICATIONS

Office Action for U.S. Appl. No. 16/415,224, mailed on Dec. 8, 2020, Ichapurapu, "Techniques for Conserving Power on a Device", 12 Pages.

Office Action for U.S. Appl. No. 16/415,224, mailed on Jun. 10, 2021, Ichapurapu, "Techniques for Conserving Power on a Device" 12 pages.

\* cited by examiner

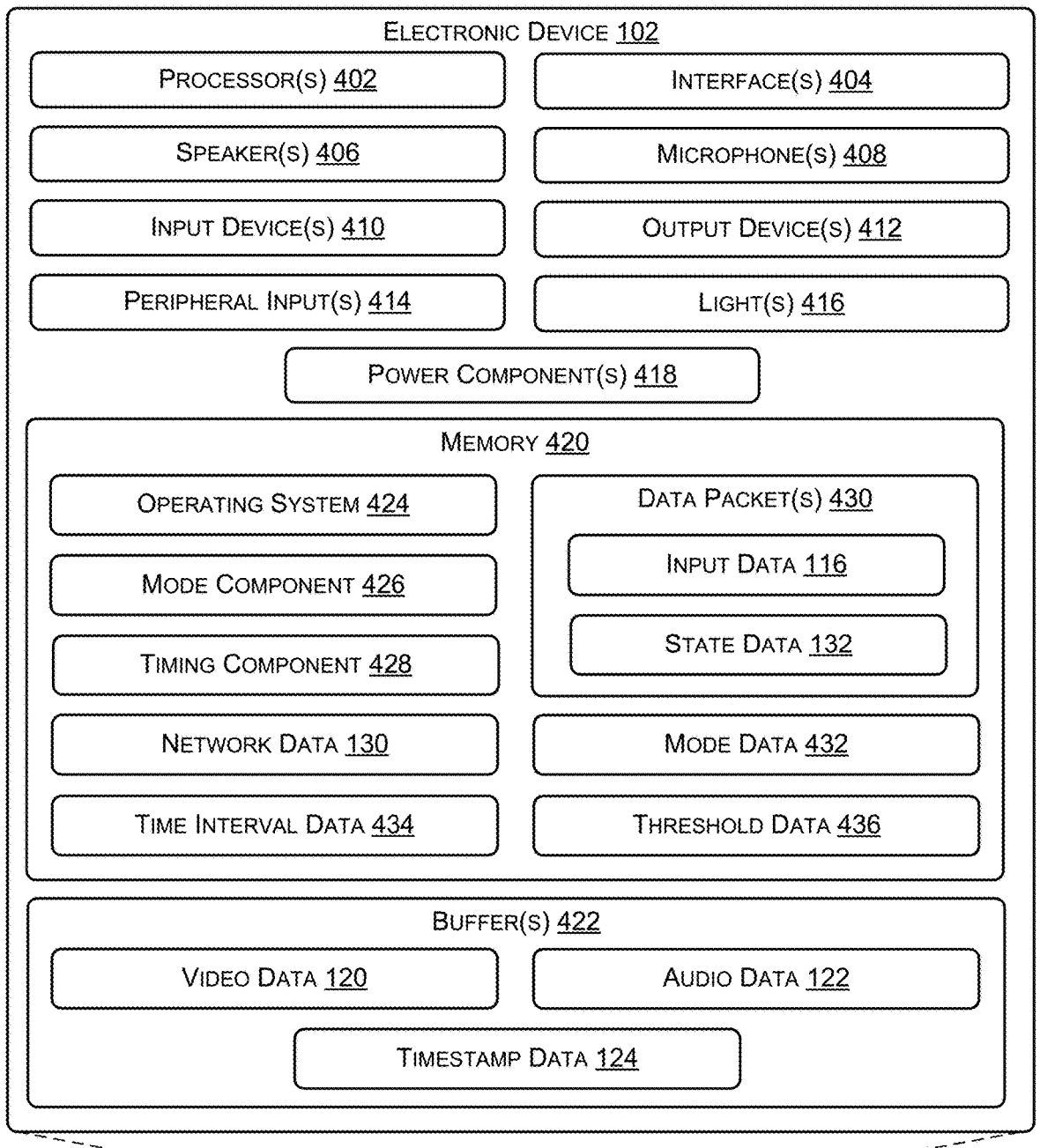
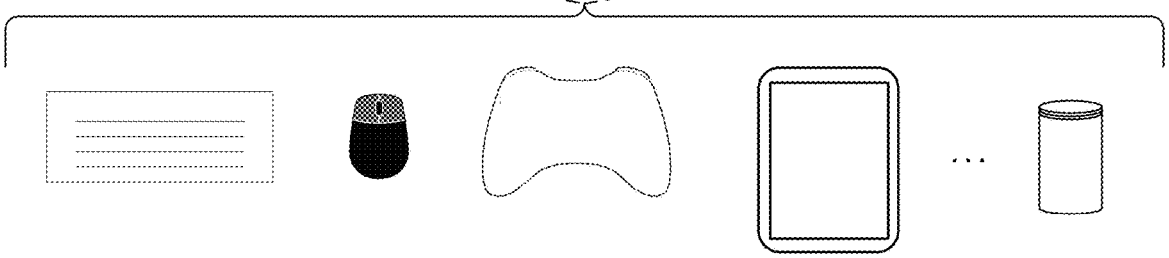
FIG. 4

TECHNIQUES FOR CONSERVING POWER ON A DEVICE

RELATED APPLICATIONS

This application claims priority to and is a continuation of U.S. patent application Ser. No. 16/415,224, filed on May 17, 2019, the entire contents of which are incorporated herein by reference

BACKGROUND

In order to conserve power on an electronic device, the electronic device may deactivate a network component that the electronic device uses to send and receive data with other electronic devices. However, during times at which the network component is deactivated, the electronic device is unable to send and receive the data with the other electronic devices. This may cause problems if the electronic device requires low-latency when sending and/or receiving the data. For example, if the electronic device is executing an application that requires the electronic device to send and/or receive data with low-latency in order to update content being output by the electronic device, the electronic device may be unable to deactivate the network component. This may will reduce the battery life of the electronic device, as the electronic device will be consuming more power.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates a block diagram of an example architecture of an electronic device that is configured to conserve power, according to various examples of the present disclosure.

DETAILED DESCRIPTION

Figure 1:
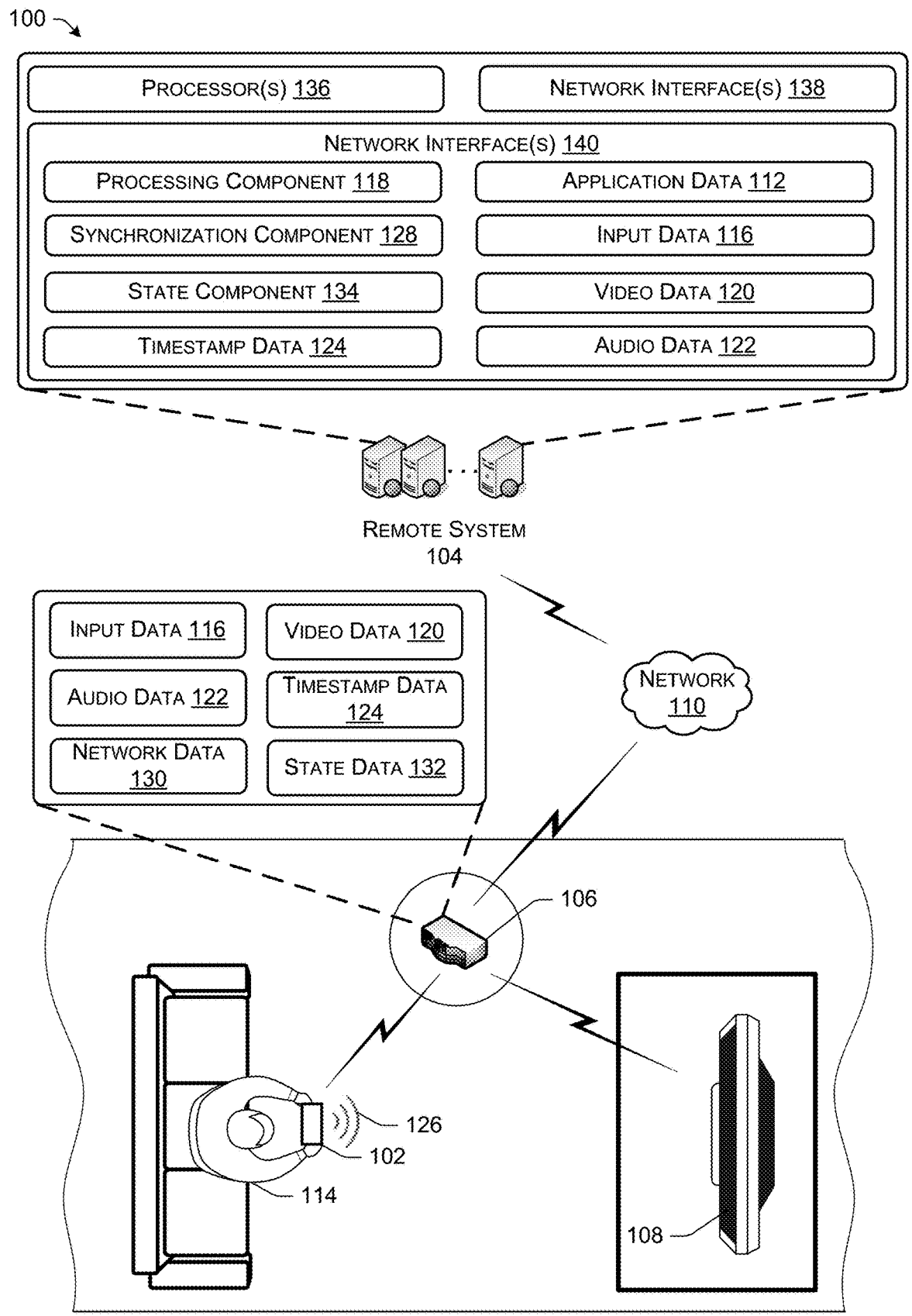
FIG. 1 illustrates a schematic diagram of an example system for conserving power on an electronic device, according to various examples of the present disclosure.

This disclosure describes, in part, systems and methods for conserving power on an electronic device. For instance, the electronic device may be configured to switch between at least a first mode of operation and a second mode of operation. While operating in the first mode, the electronic device may activate one or more components, such as by providing power from at least one battery to the one or more components. Alternatively, while operating in the second mode, the electronic device may deactivate the one or more components, such as by ceasing from providing at least a portion of the power from the at least one battery to the one or more components. The one or more components may include, but are not limited to, network interface(s), input device(s) (e.g., button(s), microphone(s), touch-sensitive control(s), etc.), output device(s) (e.g., speaker(s), display(s), haptic device(s), etc.), and/or the like. As such, the electronic device may consume less power while operating in the second mode than while operating in the first mode.

In some instances, the electronic device may send and/or receive low-latency transmissions with other electronic device(s), such as a network device, a remote system, a display device, a voice-controlled device, and/or the like. For instance, the electronic device may send and/or receive the transmissions at given time intervals. A given time interval may include, but is not limited to, five milliseconds, eight milliseconds, ten milliseconds, one hundred milliseconds, and/or the like. In instances where the electronic device is sending and/or receiving the low-latency transmissions, the electronic device may use one or more techniques to determine when to transition between the first mode and the second mode. This is because, in some examples, the electronic device may be unable to send and/or receive the transmissions with the other electronic device(s) when operating in the second mode.

For a first example technique, the electronic device may include buffer(s) that store data received from the other electronic device(s). The data may include, but is not limited to, audio data representing sound, video data representing one or more images, timestamp data representing timestamps for synchronizing the sound with the one or more images, and/or the like. As such, the electronic device may determine an amount of data stored in the buffer(s). The electronic device may then determine whether the amount of data satisfies (e.g., is equal to or greater than) a buffer threshold. In some instances, the buffer threshold may be based on an amount of data, such as one megabyte, five megabytes, ten megabytes, and/or the like. In some instances, the buffer threshold may be based on the current capacity of the buffer(s), such as fifty percent full, seventy-five percent full, ninety percent full, and/or the like. In either instance, the electronic device may determine to transition to the second mode when the amount of data satisfies the buffer threshold, but determine to remain in the first mode when the amount of data does not satisfy (e.g., is less than) the buffer threshold.

For a second example technique, the electronic device may determine a rate at which the amount of data stored in the buffer(s) is increasing or decreasing. The electronic device may then determine whether the rate satisfies a rate threshold. In some instances, the rate threshold may include, but is not limited to, one byte per millisecond, ten bytes per millisecond, one megabyte per second, ten megabytes per second, and/or any other rate. The electronic device may then determine to transition to the second mode when the rate satisfies the rate threshold, but determine to remain in the first mode when the rate does not satisfy the rate threshold.

For a third example technique, after sending data to the other electronic device(s), the electronic device may determine that a threshold period of time has elapsed without receiving data back from the other electronic device(s). The threshold period of time may include, but is not limited to, one millisecond, two milliseconds, five milliseconds, ten milliseconds, and/or the like. Based on determining that the data was not received from the other electronic device(s) during the threshold period of time, the electronic device may determine to transition to the second mode.

For a fourth example technique, the electronic device may receive, from the other electronic device(s), data representing one or more conditions associated network connection(s) between the electronic device and the other electronic device(s). A network condition may include, but is not limited to, a packet error rate (PER), a received signal strength indication (RSSI), a bit rate error, a wireless channel availability, a number of consecutive packet losses, a packet outage duration, packet arrival time, number of devices connected to the network(s), number of network(s) for which the electronic device is connected, and/or the like. The electronic device may then use the data to determine when to transition between the first mode and the second mode. For instance, the electronic device may determine to transition to the second mode when the PER satisfies a threshold PER, but determine to remain in the first mode when the PER does not satisfy the threshold PER. Additionally, or alternatively, the electronic device may determine to transition to the second mode when the RSSI does not satisfy a threshold RSSI, but determine to remain in the first mode when the RSSI satisfies a threshold RSSI.

In some instances, when switching to the second mode, the electronic device may determine a period of time for remaining in the second mode. The period of time may include, but is not limited to, one millisecond, two milliseconds, five milliseconds, and/or the like. When determining the period of time, the electronic device may determine the period of time such that the operations of the electronic device are stable. For example, if the electronic device is outputting sound in synchronization with a display device displaying content associated with the sound, the electronic device may determine the period of time such that the electronic device still receives the audio data representing the sound at a rate at which the sound continues to be synchronized with the content. As such, over time, the electronic device may utilize different periods of time until the electronic device determines an optimal period of time for remaining in the second mode.

In some instances, the electronic device notifies the other electronic device(s) when transitioning between the first mode and the second mode. For instance, and as discussed above, the electronic device may send the other electronic device(s) transmissions at the given time intervals. In some instances, a transmission may include a data packet, where the data packet includes at least data representing input(s) received by the electronic device during the given time interval and data indicating whether the electronic device is going to remain in the first mode or transition to the second mode. The data representing in the input(s) may include, but is not limited to, input data representing inputs received via input device(s), audio data representing user speech, and/or the like. The data indicating whether the electronic device is going to remain in the first mode or transition to the second mode may include, but is not limited to, one or more bits that indicate that the electronic device is going to remain in the first mode or one or more bits that indicate that the electronic device is going to transition to the second mode.

The other electronic device(s) may receive the data packets from the electronic device and, in response, determine whether to send data to the electronic device. For instance, if a data packet indicates that the electronic device is going to remain in the first mode, the other electronic device(s) may send the data to the electronic device. However, if a data packet indicates that the electronic device is going to transition to the second mode, then the other electronic device(s) may refrain from sending the data to the electronic device. Additionally, the other electronic device(s) may wait to receive, from the electronic device, another data packet that indicates that the electronic device is going to remain in the first mode. In response, the other electronic device(s) may then send the data to the electronic device.

In some instances, the other electronic device(s) may determine whether the electronic device should transition to the second mode. For a first example, the other electronic device(s) may determine an amount of data that is going to be sent to the electronic device and/or received from the electronic device. The other electronic device(s) may then determine whether the electronic device should remain in the first mode or transition the second mode based on the amount of data. For instance, if the amount of data satisfies a data threshold, then the other electronic device(s) may determine that the electronic device should remain in the first mode. However, if the amount of data does not satisfy the data threshold, then the other electronic device(s) may determine that the electronic device may transition to the second mode. The data threshold may include, but is not limited to, one megabyte per second, one megabyte per minutes, ten megabytes per minutes, and/or any other threshold.

In some instances, the other electronic device(s) may determine the amount of data based on the application that is being controlled by the electronic device. For instance, if the application includes a gaming application, the other electronic device(s) may determine if a next portion of the game requires the other electronic device(s) to send a great amount of data (e.g., audio data, video data, etc.) to the electronic device and/or receive a great amount of data (e.g., audio data, input data, etc.) from the electronic device. The other electronic device(s) may then use that determination to determine whether the electronic device should remain in the first mode or if the electronic device may transition to the second mode.

For a second example, the other electronic device(s) may determine whether the electronic device can tolerate a greater amount of latency. For instance, if the other electronic device(s) are sending audio data to the electronic device, where the audio data is synchronized with video data being sent to a display device, the other electronic device(s) may determine a latency associated with the video data being sent to the display device. The other electronic device(s) may then determine that the latency is greater than the given time intervals associated with sending the transmissions between the electronic device and the other electronic device(s). Based on determining that the latency is greater than the given time intervals, the electronic device(s) may determine that the electronic device is able to tolerate a greater amount of latency, but still synchronize the outputting of the audio data with the video data. As such, the other electronic device(s) may determine that the electronic device is able to transition to the second mode and/or transition to the second mode for longer periods of time.

For a third example, the other electronic device(s) may receive data indicating that a user associated with the electronic device is proximate to the electronic device. The other electronic device(s) may receive the data from the electronic device and/or another electronic device (e.g., a voice-controlled device, a motion sensor, a camera, etc.) that is located proximate to the electronic device. Using the data, the other electronic device(s) may determine that the user is about to use the electronic device and as such, the electronic device should transition to the first mode. In instances where the other electronic device(s) receive the data, the user may have to opt-in to a service that allows the other electronic device(s) to receive such data. In other words, the user may have to provide consent for the other electronic device(s) to receive the data.

For a fourth example, the other electronic device may receive data indicating that the user associated with the electronic device is no longer proximate to the electronic device. As such, and using the data, the other electronic device(s) may determine that the electronic device is able to transition to the second mode.

Still, for a fifth example, the other electronic device(s) may store data indicating time(s) when the electronic device is likely going to be used and time(s) when the electronic device is not likely going to be used. In some instances, the other electronic device(s) may determine the time(s) using data representing a history of times that the electronic device has been used. The other electronic device(s) may then determine that the electronic device should transition to the first mode during time(s) at which the electronic device is likely to be used, and determine that the electronic device should transition to the second mode during time(s) at which the electronic device is unlikely to be used.

In some instances, the electronic device may then receive, from the other electronic device(s), data indicating whether the electronic device should remain in the first mode or transition to the second mode. For a first example, if the other electronic device(s) determine that the amount of data satisfies the data threshold, the electronic device may receive data indicating that the electronic device should remain in the first mode in order to receive all of the data and/or send all of the data. For a second example, if the other electronic device(s) determine that the amount of data does not satisfy the data threshold, the electronic device may receive data indicating that the electronic device may transition to the second mode, at least for a period of time. In some instances, the data may indicate the period of time for transitioning to the second mode.

For a third example, if the other electronic device(s) determine that the electronic device can tolerate a greater amount of latency, the electronic device may receive data indicating that the electronic device may transition to the second mode. In some instances, the data may further indicate the period of time for which the electronic device is able to remain in the second mode. In either of the examples above, the electronic device may then use the data received from the other electronic device(s) to (1) determine to remain in the first mode, (2) determine to transition to the second mode, and/or (3) determine a period of time for remaining in the second mode.

In some instances, the electronic device may perform one or more additional techniques for conserving power. For example, and as discussed above, the electronic device may send data (e.g., the data packets) to the other electronic device(s) at the given time intervals. However, if during a given time interval the electronic device does not receive any inputs, the electronic device may refrain from sending the other electronic device(s) data (e.g., a data packet) at the elapse of the given time interval. Additionally, in some instances, the electronic device may transition to the second mode. The electronic device may then send data to the other electronic device(s) after receiving an input. Additionally, in instances where the electronic device is operating in the second mode, the electronic device may transition to the first mode in order to send the data.

Additionally, or alternatively, in some instances, while the electronic device is waiting to receive an additional input, the electronic device may increase the sampling frequency of the input device(s). For example, the electronic device may initially be sampling the input device(s) at a first frequency. The first frequency may include, but is not limited to, fifty hertz, one hundred hertz, one hundred and twenty hertz, five hundred hertz, and/or the like. After refraining from sending the data and/or transitioning to the second mode, the electronic device may then begin sampling the input device(s) at a second, greater frequency. The second frequency may include, but is not limited to, one thousand hertz, two thousand hertz, and/or the like. By increasing the frequency, the electronic device may be able to more quickly detect the additional input and transition to the first mode in order to send data representing the input to the electronic device(s).

In some instances, the other electronic device(s) sending the data to the electronic device may include a network device, such as an access point. In some instances, the electronic device and the other electronic device(s) may use PS-Poll, automatic power save delivery (APSD), unscheduled APAD (U-APSD), and/or some other power saving technique to send the data between the electronic device and the other electronic device(s). For instance, the network device may buffer the data and then send the data according to the power saving technique.

In some instances, the electronic device may use one or more additional and/or alternative modes of operation in order to conserve power. The modes of operation may include, but are not limited to, (1) a mode of operation where the electronic device is actively listing for data, receiving data, and sending data, (2) a mode of operation where the electronic device is able to quickly transition to the first mode of operation (e.g., the radio is off and the radio processor is halted, but baseband phase-locked loop (PLL), crystal are still active), (3) a mode of operation where the electronic device maintains an association with the network device, but sleeps between beacons, (4) a mode of operation where a system on chip (SoC) completes powering down part of the electronic device for minimal leakage of device hibernation, and/or the like. As described herein, the first mode and/or the second mode may include one or more of these modes of operation, as well as one or more of the other modes of the operation described herein.

As described herein, the electronic device may deactivate a component by ceasing providing at least a portion of power to the component. For instance, the network interface(s) may include one or more hardware components, such as processor(s), memory, radio(s), and/or the like. As such, deactivating the network interface(s) may include ceasing from providing power to one or more of the hardware components of the network interface(s). By ceasing from providing the power, the one or more hardware components of the network interface(s) may turn off, which saves power of the electronic device.

In some instances, the electronic device may be used as a game controller, where a gaming application is executing on a remote system. For instance, the electronic device may send data (e.g., audio data, input data, etc.) to the remote system via a network device. The remote system may then update a current state of the gaming application using the data received from the electronic device. After updating the current state of the gaming application, the remote system may send, via the network device, video data to a display device, where the video data represents the current state of the gaming application. The remote system may further send, via the network device, audio data to the electronic device, where the audio data is synchronized with the video data.

FIG. 1 is a schematic diagram of an example system 100 for conserving power on an electronic device 102, according to various aspects of the present disclosure. The system 100 may include, for example, the electronic device 102, a remote system 104, a network device 106 (e.g., an access point), and a display device 108. In the example of FIG. 1, the electronic device 102 may communicate with the remote system 104 via the network device 106. For instance, the electronic device 102 may send data to the network device 106, which may then send the data to the remote system 104 via network(s) 110. Additionally, the remote system 104 may send data to the network device 106 via the network(s) 110, which may then send the data to the electronic device 102. Furthermore, the remote system 104 may communicate with the display device 108 via the network device 106. For instance, the remote system 104 may send data to the network device 106 via the network(s) 110, which may then send the data to the display device 108.

In some instances, the remote system 104 may store application data 112 representing one or more applications that are accessible by the electronic device 102 via the network(s) 110. An application may include, but is not limited to, a gaming application, a word processing application, an educational application, a multimedia application (e.g., movie, music, etc.), and/or any other type of application that is capable of being accessed via the network(s) 110. While accessing an application, the electronic device 102 may receive inputs from a user 114. The electronic device 102 may then send, to the remote system 104, input data 116 representing the inputs. The remote system 104 may then use a processing component 118 to update a current state of the application based on the input data 116.

The remote system 104 may then send, to the network device 106, data representing the current state of the application. The data may include, but is not limited to, video data 120 representing image(s) of the current state of the application, audio data 122 representing sound corresponding to the current state of the application, and/or timestamp data 124 representing a time for displaying the current state of the application and/or a time for outputting the sound. In some instances, the remote system 104 sends a data packet that includes the video data 120, the audio data 122, and/or the timestamp data 124. In other instances, the remote system 104 may separately send the video data 120, the audio data 122, and/or the timestamp data 124 to the network device 106.

The network device 106 may then send the video data 120, the audio data 122, and/or the timestamp data 124 to the display device 108. In some instance, the network device 106 may send a data packet that includes the video data 120, the audio data 122, and/or the timestamp data 124. In other instances, the network device 106 may separately send the video data 120, the audio data 122, and/or the timestamp data 124. In either instance, using the video data 120, the display device 108 may display image(s) representing the current state of the application. For example, if the application includes a gaming application, the display device 108 may display content representing a current state of the game. In the example of FIG. 1, the current state of the game may include an object (e.g., a character) located at a position in a gaming environment (e.g., a forest). In some instances, the display device 108 may further output the sound represented by the audio data 122. In some instances, the display device 108 displays the image(s) and/or outputs the sound according to the time(s) represented by the timestamp data 124.

For example, the display device 108 may determine when a current time includes the time represented by the timestamp data 124 for displaying the video data 120. Based at least in part on the determination, the display device 108 may begin displaying the image(s) representing the current state of the application. Additionally, the display device 108 may determine when a current time includes the time represented by the timestamp data 124 for outputting the sound. Based at least in part on the determination, the display device 108 may begin outputting the sound represented by the audio data 122.

The network device 106 may further send the video data 120, the audio data 122, and/or the timestamp data 124 to the electronic device 102. In some instance, the network device 106 may send a data packet that includes the video data 120, the audio data 122, and/or the timestamp data 124. In other instances, the network device 106 may separately send the video data 120, the audio data 122, and/or the timestamp data 124. In either instance, electronic device 102 may then output the sound represented by the audio data 122, which is represented by 126. In some instances, the electronic device 102 may output the sound according to the time represented by the timestamp data 124. In such instances, the timestamp data 124 synchronizes the outputting of the sound by the electronic device 102 with the displaying of the image(s) by the display device 108.

For instance, a synchronization component 128 of the remote system 104 may be configured to synchronize at least the displaying of the image(s) by the display device 108 with the outputting of the sound by the electronic device 102. To perform the synchronization, the synchronization component 128 may generate first timestamp data 124 for displaying the image(s) and/or second timestamp data 124 for outputting the sound. For instance, the first timestamp data 124 may represent an instruction to display the image(s) at a first time. Additionally, the second timestamp data 124 may represent an instruction to output the sound at a second time. In some instances, the first time may be similar to the second time. In some instances, the first time may be within a threshold period of time to the second time. The threshold period of time may include, but is not limited to, one millisecond, ten milliseconds, one second, and/or the like.

The user 114 can then use the electronic device 102 to provide inputs to the application. For instance, the electronic device 102 may receive an input, such as a selection of a button, joystick, key, touch-sensitive pad, sensor, and/or the like associated with the electronic device 102. The electronic device 102 may then send, to the remote system 104 via the network device 106, the input data 116 representing the input. Using the input data 116, the processing component 118 may update the state of the application. For example, and using the example above where the application includes the gaming application, the input may be associated with moving the object forward by a given amount within the gaming environment. As such, the processing component 118 may analyze the input data 116 to determine that the input includes moving the object forward by the given amount. The processing component 118 may then update the state of the of the application by moving the object forward in the environment by the given amount.

The remote system 104 may then send, to the network device 106, additional video data 120, additional audio data 122, and/or additional timestamp data 124 representing the new state of the application. The network device 106 may then send the additional video data 120, the additional audio data 122, and/or the additional timestamp data 124 to the display device 108 and/or the electronic device 102. Similar to the techniques described above, the display device 108 may then display image(s) represented by the additional video data 120 while the electronic device 102 is outputting the sound represented by the additional audio data 122.

In some instances, the remote system 104 may continue to receive the input data 116 from the electronic device 102 via the network device 106. The processing component 118 may then continue to process the input data 116 in order to update the state of the application. Based at least in part on the updating, the remote system 104 may continue to send, to the network device 106, the video data 120, the audio data 122, and/or the timestamp data 124 representing the current state of the application. Additionally, the network device 106 may continue to send the video data 120, the audio data 122, and/or the timestamp data 124 to the display device 108 and/or the electronic device 102. Using the data, the electronic device 102 may continue to synchronize the outputting of the sound with the displaying of the content by the display device 108.

In the example of FIG. 1, the electronic device 102 may be configured to transition between at least a first mode of operation and a second mode of operation. While operating in the first mode, the electronic device 102 may activate one or more components, such as providing power from at least one battery to the one or more components. Alternatively, while operating in the second mode, the electronic device 102 may deactivate the one or more components, such as by ceasing from providing at least a portion of the power from the at least one battery to the one or more components. The one or more components may include, but are not limited to, network interface(s), input device(s) (e.g., button(s), microphone(s), touch-sensitive control(s), etc.), output device(s) (e.g., speaker(s), display(s), haptic device(s), etc.), and/or the like. As such, the electronic device 102 may consume less power operating in the second mode than operating in the first mode.

In some instances, the electronic device 102 may be required to send and/or receive low-latency transmissions with the remote system 104 via the network device 106. This may be because the application being executed by the remote system 104 is continuously being updated, where the outputting of the sound by the electronic device 102 is synchronized with the displaying of the content by the display device 108. As such, the electronic device 102 may send and/or receive the transmissions at given time intervals. As discussed herein, a given time interval may include, but is not limited to, five milliseconds, eight milliseconds, ten milliseconds, one hundred milliseconds, and/or the like. Since the electronic device 102 is transitioning between the different modes of operation, and the electronic device 102 needs to send the low-latency transmissions, the electronic device 102 may use one or more techniques to determine when to remain in the first mode, when to transition to the second mode, and/or a period of time for remaining in the second mode after the transition.

For a first example, the electronic device 102 may include buffer(s) that store data (e.g., the video data 120, the audio data 122, and/or the timestamp data 124) received from the network device 106. As such, the electronic device 102 may determine an amount of data stored in the buffer(s). The electronic device 102 may then determine whether the amount of data satisfies (e.g., is equal to or greater than) a buffer threshold. In some instances, the buffer threshold may be based on an amount of data, such as one megabyte, five megabytes, ten megabytes, and/or the like. In some instances, the buffer threshold may be based on the current capacity of the buffer(s), such as fifty percent full, seventy-five percent full, ninety percent full, and/or the like. In either instance, the electronic device 102 may determine to transition to the second mode when the amount of data satisfies the buffer threshold, but determine to remain in the first mode when the amount of data does not satisfy (e.g., is less than) the buffer threshold.

For a second example technique, the electronic device 102 may determine a first amount of data stored in the buffer(s) and then, after a period of time, determine a second mount of data stored in the buffer(s). The electronic device 102 may then using the first amount of data and the second amount of data to determine a rate at which the amount of data stored in the buffer(s) is increasing or decreasing. The electronic device 102 may then determine whether the rate satisfies a rate threshold. In some instances, the rate threshold may include, but is not limited to, one byte per millisecond, ten bytes per millisecond, one megabyte per second, ten megabytes per second, and/or any other rate. The electronic device 102 may then determine to transition to the second mode when the rate satisfies the rate threshold, but determine to remain in the first mode when the rate does not satisfy the rate threshold.

For a third example, after sending data to the network device 106, the electronic device 102 may determine that a threshold period of time has elapsed without receiving data (e.g., the video data 120, the audio data 122, and/or the timestamp data 124) back from the network device 106. The threshold period of time may include, but is not limited to, one millisecond, two milliseconds, five milliseconds, ten milliseconds, and/or the like. Based on determining that the data was not received from the network device 106 during the threshold period of time, the electronic device 102 may determine to transition to the second mode.

For a fourth example, the electronic device 102 may receive, from the network device 106, network data 130 representing one or more conditions associated with the network connection between the electronic device 102 and the network device 106 and/or the network connection between the network device 106 and the remote system 104. A network condition may include, but is not limited to, a PER, a RSSI, a bit rate error, a wireless channel availability, a number of consecutive packet losses, a packet outage duration, packet arrival time, number of devices connected to the network(s), number of network(s) for which the electronic device is connected, and/or the like. The electronic device 102 may then use the network data 130 to determine when to transition between the first mode and the second mode. For instance, the electronic device 102 may determine to transition to the second mode when the PER satisfies a threshold PER, but determine to remain in the first mode when the PER does not satisfy a threshold PER. Additionally, or alternatively, the electronic device 102 may determine to transition to the second mode when the RSSI does not satisfy a threshold RSSI, but determine to remain in the first mode when the RSSI satisfies a threshold RSSI.

In some instances, when transitioning to the second mode, the electronic device 102 may determine a period of time to remain in the second mode. The period of time may include, but is not limited to, one millisecond, two milliseconds, five milliseconds, and/or the like. When determining the period of time, the electronic device 102 may determine the period of time such that the operations of the electronic device 102 are stable. For example, the electronic device 102 may determine the period of time such that the electronic device 102 is still able to synchronize the outputting of the sound with the display device 108 displaying the content. As such, over time, the electronic device 102 may utilize different period of time until the electronic device 102 determines an optimal period of time.

In some instances, the electronic device 102 notifies the network device 106 when transitioning between the first mode and the second mode. For instance, and as discussed above, the electronic device 102 may send the network device 106 transmissions at the given time intervals. In some instances, a transmission may include a data packet, where the data packet includes at least the input data 116 representing the input(s) received by the electronic device 102 during the given time interval and state data 132 indicating whether the electronic device 102 is going to remain in the first mode or transition to the second mode. In some instances, the state data 132 may include one or more bits that indicate that the electronic device 102 is going to remain in the first mode or one or more bits that indicate that the electronic device 102 is going to transition to the second mode.

The network device 106 may receive the data packets from the electronic device 102 and, in response, determine whether to send the electronic device 102 data (e.g., the video data 120, the audio data 122, and/or the timestamp data 124). For instance, if the state data 132 indicates that the electronic device 102 is going to remain in the first mode, the network device 106 may send the data to the electronic device 102. However, if the state data 132 indicates that the electronic device 102 is going to transition to the second mode, then the network device 106 may refrain from sending the data to the electronic device 102. Additionally, the network device 106 may wait to receive, from the electronic device 102, another data packet that includes state data 132 indicating that the electronic device 102 is going to remain in the first mode. In response, the network device 106 may then send the data to the electronic device 102.

In some instances, the remote system 104 may determine whether the electronic device 102 should transition to the second mode. For a first example, a state component 134 of the remote system 104 may determine an amount of data that is going to be sent to the electronic device 102 and/or received from the electronic device 102. The state component 134 may then determine whether the electronic device 102 should remain in the first mode or transition the second mode based on the amount of data. For instance, if the amount of data satisfies a data threshold, then the state component 134 may determine that the electronic device 102 should remain in the first mode. However, if the amount of data does not satisfy the data threshold, then the state component 134 may determine that the electronic device 102 may transition to the second mode. As described herein, the data threshold may include, but is not limited to, one megabyte per second, one megabyte per minutes, ten megabytes per minutes, and/or any other threshold.

In some instances, the state component 134 may determine the amount of data based on the application that is being executed by the remote system 104. For instance, if the application includes a gaming application, the state component 134 may determine if a next portion of the game requires the remote system 104 to send a great amount of data (e.g., the video data 120, the audio data 122, and/or the timestamp data 124) to the electronic device 102 and/or receive a great amount of data (e.g., the input data 116) from the electronic device 102. The state component 134 may then use that determination to determine whether the electronic device 102 should remain in the first mode or if the electronic device 102 may transition to the second mode.

For a second example, the state component 134 may determine whether the electronic device 102 can tolerate a greater amount of latency. For instance, the state component 134 may determine a latency associated with the video data 120 being sent to the display device 108. The state component 134 may then determine that the latency is greater than the given time intervals associated with sending the transmissions between the electronic device 102 and the network device 106. Based on determining that the latency is greater than the given time intervals, the state component 134 may determine that the electronic device 102 is able to tolerate a greater amount of latency, but still synchronize the outputting of the sound represented by the audio data 122 with the displaying of the content represented by the video data 120. As such, the state component 134 may determine that the electronic device 102 is able to transition to the second mode.

In some instances, the electronic device 102 may then receive, from the network device 106, data (which may also be represented by the state data 132) indicating whether the electronic device 102 should remain in the first mode or transition to the second mode. For a first example, if the state component 134 determines that the amount of data satisfies the data threshold, the electronic device 102 may receive data indicating that the electronic device 102 should remain in the first mode. For a second example, if the state component 134 determines that the amount of data does not satisfy the data threshold, the electronic device 102 may receive data indicating that the electronic device 102 may transition to the second mode, at least for a period of time. In some instances, the data may indicate the period of time for transitioning to the second mode.

For a third example, if the state component 134 determines that the electronic device 102 can tolerate a greater amount of latency, the electronic device 102 may receive data indicating that the electronic device 102 may transition to the second mode. In some instances, the data may further indicate a period of time for transitioning to the second mode and/or indicate the new latency. In either of the examples above, the electronic device 102 may then use the data received from the network device 106 to (1) determine to remain in the first mode, (2) determine to transition to the second mode, and/or (3) determine a period of time for remaining in the second mode.

In the example of FIG. 1, the remote system 104 further includes processor(s) 136, network interface(s) 138, and memory 140. As used herein, a processor, such as the processor(s) 136, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 140, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

Network interface(s), such as the network interface(s) 138, may enable data to be sent between devices. For example, the network interface(s) 138 may enable data to be sent between the remote system 104, the network device 106, the electronic device 102, the display device 108, and/or with one or more other remote systems, as well as other networked devices. The network interface(s) may include one or more network interface controllers (NICs) or other types of transceiver devices to send and receive messages over the network(s) 110.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

The operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

Figure 2:
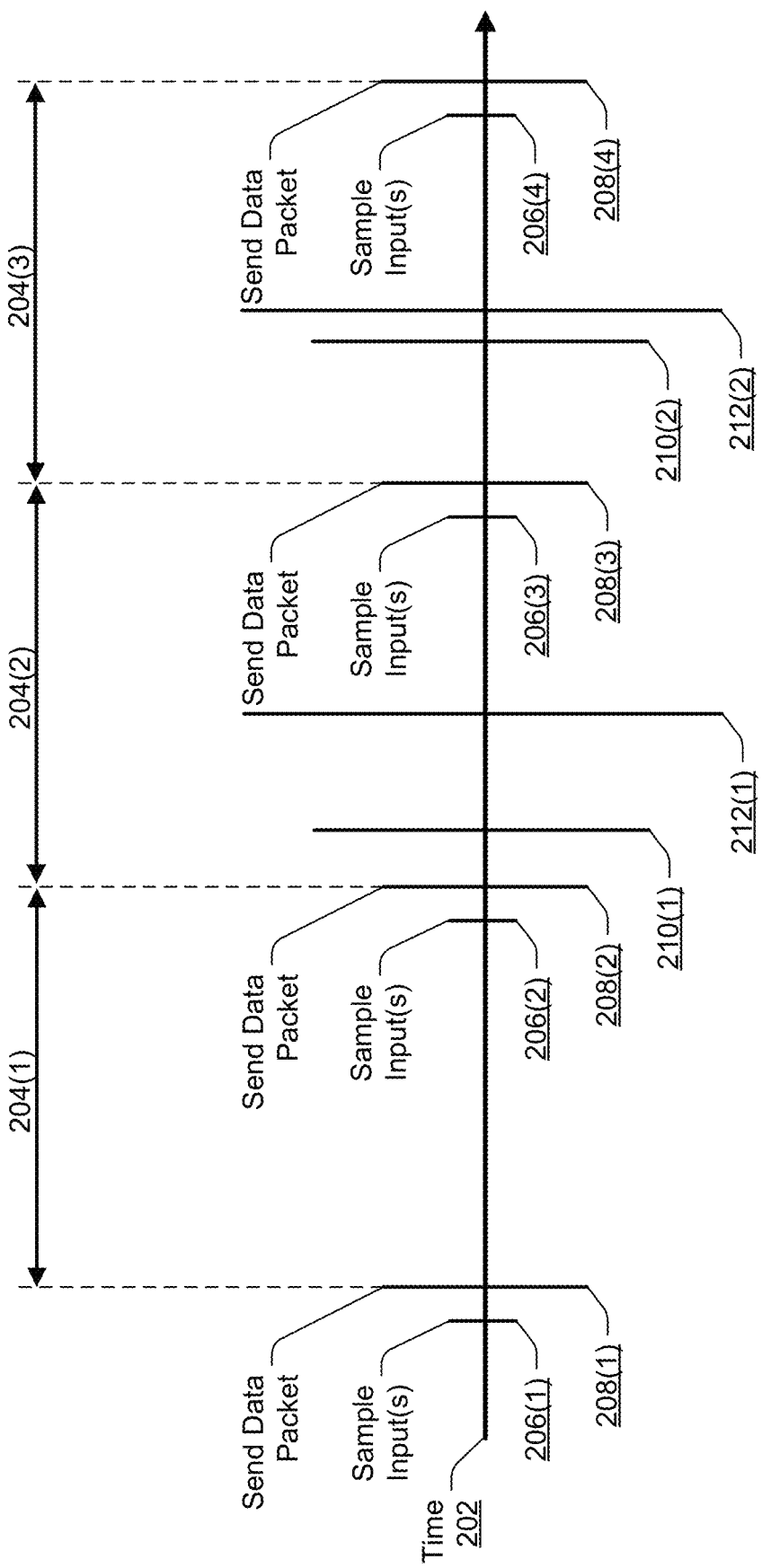
FIG. 2 illustrates an example of an electronic device sending low-latency transmissions while conserving power, according to various aspects of the present disclosure.

FIG. 2 illustrates an example of the electronic device 102 sending low-latency transmissions while conserving power, according to various examples of the present disclosure. For example, and as discussed above, over a period of time 202, the electronic device 102 may send data packets to the network device 106 at given time intervals 204(1)-(3). For instance, the electronic device 102 may sample the input device(s) at time 206(1) and, in response, detect a first input. Based at least in part on the first input, electronic device 102 may then send a first data packet to the network device 106 at time 208(1), where the first data packet includes at least first input data 116 representing the first input. The electronic device 102 may then sample the input device(s) at time 206(2) and, in response, detect a second input. Based at least in part on the second input, electronic device 102 may send a second data packet to the network device 106 at time 208(2), where the second data packet includes at least second input data 116 representing the second input.

Additionally, the electronic device 102 may sample the input device(s) at time 206(3) and, in response, detect a third input. Based at least in part on the third input, electronic device 102 may send a third data packet to the network device 106 at time 208(3), where the third data packet includes at least third input data 116 representing the third input. Furthermore, the electronic device 102 may sample the input device(s) at time 206(4) and, in response, detect a fourth input. Based at least in part on the fourth input, electronic device 102 may send a fourth data packet to the network device 106 at time 208(4), where the fourth data packet includes at least fourth input data 116 representing the fourth input.

During the given time intervals 204(1)-(3), the electronic device 102 may further be determining if predefined events occur. For instance, during the first given time interval 204(1), the electronic device 102 may detect a predefined event. In some instances, the predefined event may include an amount of data stored in the buffer(s) satisfying the buffer threshold. In some instances, the predefined event may be associated with one or more conditions associated with the network connection between the electronic device 102 and the network device 106. Still, in some instances, the predefined event may include the electronic device 102 receiving data indicating that the electronic device 102 may transition to the second mode.

In either instance, the second data packet may further include state data 132 indicating that the electronic device 102 is going to transition to the second mode. The electronic device may then transition to the second mode at time 210(1). Additionally, after a period of time has elapsed, the electronic device 102 may transition back to the first mode at time 212(1). In some instances, the electronic device 102 may then determine whether a predefined event occurs during the second time interval 204(2).

In the example of FIG. 2, the electronic device 102 may determine that a predefined event does not occur during the second time interval 204(2). As such, the third data packet may further include data indicating that the electronic device 102 will remain in the first mode. However, after sending the third data packet, the electronic device 102 may detect a predefined event, such as the electronic device 102 not receiving data from the network device 106 for the threshold period of time after sending the third data packet. As such, the electronic device 102 may transition to the second mode at time 210(2). Additionally, after a period of time has elapsed, the electronic device 102 may transition back to the first mode at time 212(2).

Figure 3:
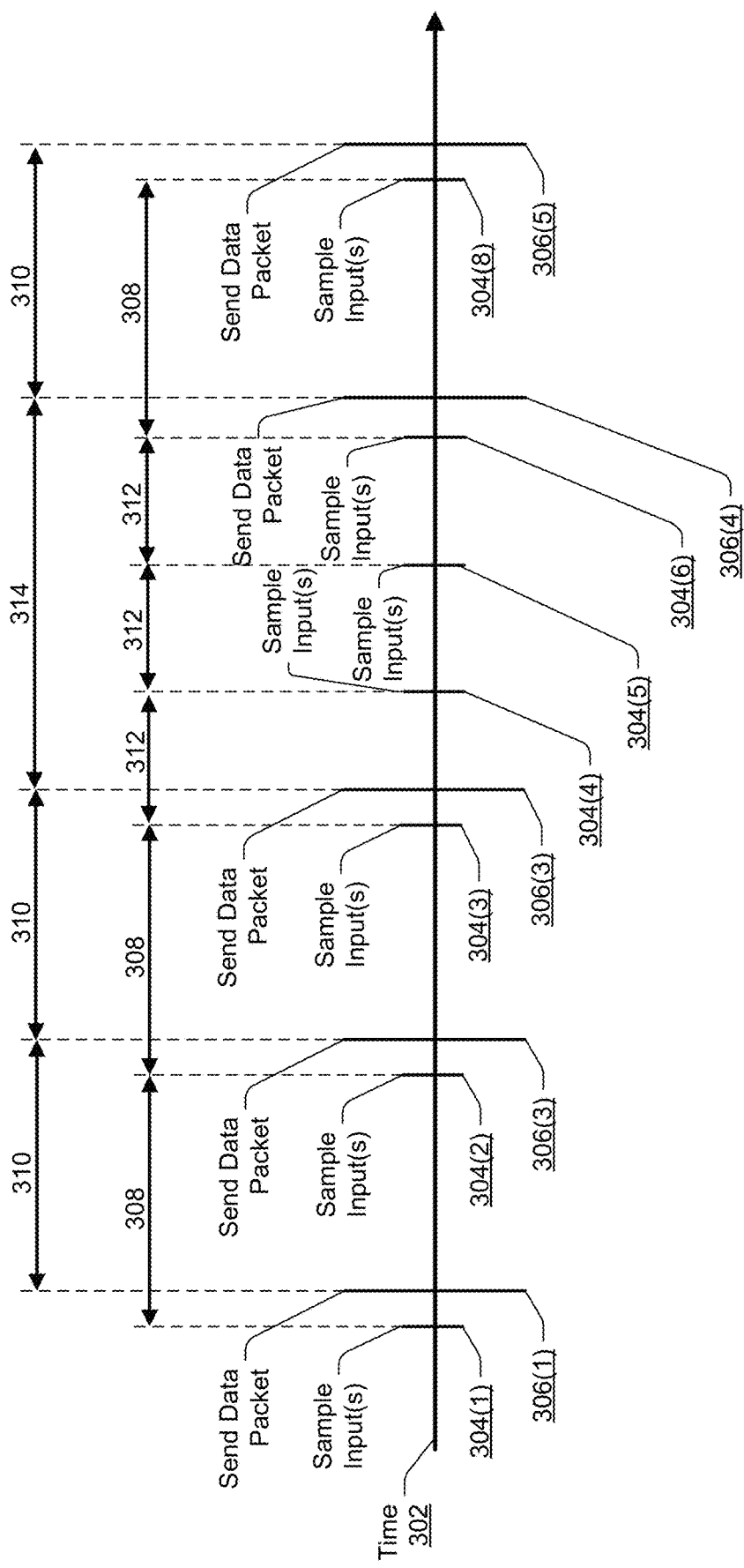
FIG. 3 illustrates an example of a technique for conserving power on an electronic device, according to various examples of the present disclosure.

FIG. 3 illustrates an example of another technique for conserving power on the electronic device 102, according to various aspects of the present disclosure. For example, and as discussed above, the electronic device 102 may send data (e.g., the data packets) to the network device 106 at given time intervals. However, if during a given time interval the electronic device 102 does not receive any inputs, the electronic device 102 may refrain from sending the data to the network device 106 at the elapse of the given time interval. Additionally, in some instances, the electronic device 102 may transition to the second mode. The electronic device 102 may then send data to the network device 106 after receiving an input. Additionally, in instances where the electronic device 102 is operating in the second mode, the electronic device 102 may transition to the first mode in order to send the data.

For instance, and as shown in the example of FIG. 3, during the course of time 302, the electronic device 102 may sample the input device(s) to determine if at least one of the input device(s) receives an input. If the electronic device 102 determines that at least one of the input device(s) receives an input, the electronic device may then send a data packet to the network device 106. The data packet may include at least input data 116 representing the input.

For example, the electronic device 102 may sample the input device(s) at time 304(1) and, in response, detect a first input. Based at least in part on the first input, electronic device 102 may send a first data packet to the network device 106 at time 306(1), where the first data packet include first input data 116 representing the first input and first state data 132 indicating that the electronic device 102 will remain in the first state. The electronic device 102 may again sample the input device(s) at time 304(2) and, in response, detect a second input. Based at least in part on the second input, electronic device 102 may then send a second data packet to the network device 106 at time 306(2), where the second data packet include second input data 116 representing the second input and second state data 132 indicating that the electronic device 102 will reaming in the first state.

The electronic device 102 may then sample the input device(s) at time 304(3) and, in response, not detect an input. Based at least in part on not detecting the input, the electronic device 102 may send a third data packet to the network device 106 at time 306(3), where the third data packet 306(3) includes third state data 132 indicating that the electronic device 102 is going to transition to the second mode. While in the second mode, the electronic device 102 may sample the input device(s) at time 304(4) and, in response, not detect an input. As such, the electronic device 102 may remain in the second mode and/or cease from sending another data packet to the network device 106.

While still in the second mode, the electronic device 102 may sample the input device(s) at time 304(5) and, in response, again not detect an input. As such, the electronic device 102 may remain in the second mode and/or cease from sending another data packet to the network device 106.

The electronic device 102 may continue this process until detecting another input. For instance, the electronic device 102 may sample the input device(s) at time 304(6) and, in response, detect a third input. Based at least in part on the third input, electronic device 102 may transition back to the first mode. The electronic device may then send a fourth data packet to the network device 106 at time 306(4), where the fourth data packet include third input data 116 representing the third input and fourth state data 132 indicating that the electronic device 102 will remain in the first state. Additionally, the electronic device 102 may sample the input device(s) at time 304(7) and, in response, detect a fourth input. Based at least in part on the fourth input, electronic device 102 may send a fifth data packet to the network device 106 at time 306(5), where the fifth data packet include fourth input data 116 representing the fourth input and fifth state data 132 indicating that the electronic device 102 will remain in the first state.

In some instances, and as illustrated in the example of FIG. 3, as long as the electronic device 102 continues to receive input, the electronic device 102 may sample the input device(s) using a first frequency. For instance, the electronic device 102 may sample the input device(s) at the elapse of a first time interval 308. Additionally, the electronic device 102 may send the data packets to the network device 106 at the elapse of a second time interval 310. In some instances, the first time interval 308 is the same as the second time interval 310. In some instances, the first time interval 308 is different than the second time interval 310. In either instance, the electronic device 102 may continue to use the first time interval 308 and/or the second time interval 310 until the electronic device 102 does not receive an input.

For instance, and as also illustrated in the example of FIG. 3, after not receiving the input at time 304(3), the electronic device 102 may begin to sample the input device(s) at a second, different frequency. For instance, the electronic device 102 may sample the input device(s) at the elapse of a third time interval 312. The electronic device 102 may then continue to use the second frequency until receiving the third input, at time 304(6). Additionally, since the electronic device 102 was operating in the second mode between time 306(3) and time 306(4), based on not receiving any inputs during that time period, a fourth time interval 314 between sending the third data packet and the fourth data packet was greater than the first time interval 310. Using all of these techniques, the electronic device 102 may conserve power.

While the example of FIG. 3 describes the electronic device 102 switching to the second mode after not receiving an input at time 304(3), in other examples, the electronic device 102 may switch to the second mode based on one or more other factors. For example, the electronic device 102 may continue to receive the same input, such as at time 304(1), time 304(2), and time 304(3). For instance, the user may be holding down one of the input devices of the electronic device 102. The electronic device 102 may then determine that the same input has been received for a threshold amount of time and/or for a threshold number of inputs. The threshold amount of time may include, but is not limited to, eight milliseconds, sixteen milliseconds, twenty-four milliseconds, fifty milliseconds, and/or the like. The threshold number of inputs may include, but is not limited to, two inputs, five inputs, ten inputs, twenty inputs, and/or the like.

Based on receiving the same input for the threshold amount of time and/or the threshold number of inputs, the electronic device 102 may determine to switch to the second mode until receiving a different input from the user. Additionally, in some instances, the third data packet may further include data indicating that the electronic device 102 is continuing to receive the same input. As such, and while the electronic device 102 is operating in the second mode, the remote system 104 may continue to update the state of the application based on the electronic device 102 continually receiving the input.

FIG. 4 illustrates a block diagram of an example architecture of the electronic device 102 that is configured to conserve power, according to various examples of the present disclosure. As shown, the electronic device 102 includes processor(s) 402, network interface(s) 404, speakers 406, microphone(s) 408, input device(s) 410, output device(s) 412, peripheral input(s) 414, light(s) 416, power component(s) 418, memory 420, and buffer(s) 422 (which, in some instances, may be included as part of the memory 420). In some instances, the electronic device 102 may include one or more additional components no illustrated in the example of FIG. 4. In some instances, the electronic device 102 may not include one or more of the speaker(s) 406, the microphone(s) 408, the input device(s) 410, the output device(s) 412, the light(s) 416, or the peripheral input(s) 414.

Although the electronic device 102 is illustrated as having one or more integral speaker(s) 406, in other examples, the electronic device 102 may not include speaker(s) 406. For example, the electronic device 102 may produce an audio output signal that drives an external loudspeaker, such as headphones connected to the electronic device 102 via a peripheral input 414. As another example, the electronic device 102 may drive or control an external loudspeaker through a wireless data connection such as a Bluetooth connection. In other situations, the electronic device 102 may be used in conjunction with a loudspeaker device that receives audio data and other instructions from the remote system 104, rather than from the electronic device 102.

The microphone(s) 408 may include sensors (e.g., transducers) configured to receive sound. The microphone(s) 408 may generate input signals for audio input (e.g., sound). For example, the microphone(s) 408 may determine digital input signals for an utterance of a user. In some instances, the microphone(s) 408 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 3113) to receive sound from four directions. The microphone(s) 408 may be in a planar configuration, or positioned apart in a non-planar three-dimensional region. In some instances, the microphone(s) 408 may include a spatially disparate array of sensors in data communication. For example, a networked array of sensors may be included. The microphone(s) 408 may include omni-directional microphones, directional microphones (e.g., shotgun microphones), and so on.

In some instances, the microphone(s) 408 and the speaker(s) 406 facilitate interactions, such as dialogue, with a user. The microphone(s) 408 produce audio data representing sound from the environment of the electronic device 102, such speech utterances by the user. The audio data produced by the microphone(s) 408 may comprise directional audio signals or may be used to produce directional audio signals, where each of the directional audio signals emphasizes audio from a different radial direction relative to the microphone(s) 408.

The input device(s) 410 may include button(s), key(s), joystick(s), touch-sensitive pad(s), trigger(s), sensor(s) that detect movement of the electronic device 102 (e.g., accelerometer(s), magnetometer(s), etc.), and/or any other type of device that is able to receive input from the user. The output device(s) 412 may include devices that provide feedback to the user. For instance, the output device(s) 412 may include haptic driver(s) that cause actuator(s) to activate.

The power component(s) 418 may be configured to provide power to the electronic device 102. For a first example, the power component(s) 418 may include one or more batteries. In some instances, the one or more batteries may be rechargeable. For a second example, the power component(s) 418 may include components connected to a source of external AC (alternating-current) power, such as a household AC power supply (alternatively referred to herein as "AC mains" or "wall power").

The light(s) 416 may include visual indicator(s) (e.g., light-emitting diodes (LEDs)) that emit light when activated by the electronic device 102. In some instances, the visual indicator(s) may include a light ring disposed on a portion of the electronic device 102. In other instances, the visual indicator(s) may be disposed on various portions on the electronic device 102. The peripheral input(s) 414 may include one or more components for connecting peripheral devices to the electronic device 102. For instance, a peripheral input 414 may include a jack for connecting headphones to the electronic device 102.

The electronic device 102 may include memory 420. The memory 420 may be used to store any number of software components that are executable by the processor(s) 402. Software components stored in the memory 420 may include an operating system 424 that is configured to manage hardware and services within and coupled to the electronic device 102. In addition, executable components stored by the memory 420 may include a mode component 426 and a timing component 428. The mode component 426 may be configured to determine when the electronic device 102 is to remain in the first mode or transition to the second mode, using one or more of the techniques described herein. The mode component 426 may further be configured to cause the electronic device 102 to transition between the first mode and the second mode. For example, the mode component 426 may cause power from the power component(s) 418 to be provided to one or more of the components 402-416 when the electronic device 102 is operating in the first mode. Additionally, the mode component 426 may cease from causing at least a portion of the power to be provided to one or more of the components 402-416 when the electronic device 102 transitions to the second mode.

The timing component 428 may be configured to determine when time intervals elapse. For a first example, after sending data to the network device 106, the timing component 428 may determine when the given time interval associated with sending additional data to the network device 106 elapses. At the elapse of the time interval, the electronic device 102 may send the additional data to the network device 106. For a second example, when the electronic device 102 transitions to the second mode, the timing component 428 may determine when a period of time associated with remaining in the second mode elapses. At the elapse of the period of time, the mode component 426 may cause the electronic device 102 to once again operate in the first mode.

As further illustrated in FIG. 4, the memory 420 may include the input data 116 generated by the electronic device 102, where the electronic device 102 sends the input data 116 to at least the remote system 104 via the network device 106. In some instances, to send the input data 116, the electronic device 102 may generate data packet(s) 430 that include at least the input data 116 and the state data 132 indicating whether the electronic device 102 will remain in the first mode or whether the electronic device 102 will be transitioning to the second mode.

In the example of FIG. 4, the memory 420 further stores mode data 432 representing the different modes of the electronic device 102. For a first example, the mode data 432 may indicate that, when the electronic device 102 is operating in the first mode, the electronic device 102 is to provide power to one or more of the components 402-416 and, when the electronic device is operating in the second mode, the electronic device 102 is to cease providing at least a portion of the power to one or more of the components 402-416.

Additionally, or alternatively, and for a second example, the mode data 432 may represent other modes, such as (1) a mode of operation where the electronic device 102 is actively listing for data, receiving data, and sending data, (2) a mode of operation where the electronic device 102 is able to quickly switch to the first mode of operation (e.g., the radio is off and the radio processor is halted, but baseband phase-locked loop (PLL), crystal are still active), (3) a mode of operation where the electronic device 102 maintains an association with the network device 106, but sleeps between beacons, (4) a mode of operation where a system on chip (SoC) completes powering down part of the electronic device 102 for minimal leakage of device hibernation, and/or the like. While these are just a couple of examples of modes represented by the mode data 432, in other examples, the mode data 432 may represent one or more additional modes of operation.

In some instances, the memory 420 may further store time interval data 434. The time interval data 434 may indicate the given time intervals for sending the data packet(s) 430 to the network device 106. For example, the time interval data 434 may indicate that the electronic device 102 is to send the data packet(s) 430 every five milliseconds, eight milliseconds, ten milliseconds, one hundred milliseconds, and/or the like. In some instances, the time intervals may be updated based on one or more factors. The one or more factors may include, but are not limited to, the mode of operation of the electronic device 102, the current power level of the power component(s) 418, the one or more conditions represented by the network data 130, and/or the like.

In some instances, the memory 420 may further store threshold data 436 representing one or more of the thresholds described herein. For a first example, the threshold data 436 may represent the buffer threshold that the mode component 426 uses to determine whether to remain in the first mode or transition to the second mode. For a second example, the threshold data 436 may represent the threshold amount of time that the mode component 426 uses to determine whether to remain in the first mode or transition to the second mode. While these are just a few examples of thresholds that may be represented by the threshold data 436, in other examples, the threshold data 436 may represent one or more additional thresholds described herein.

Figure 5:
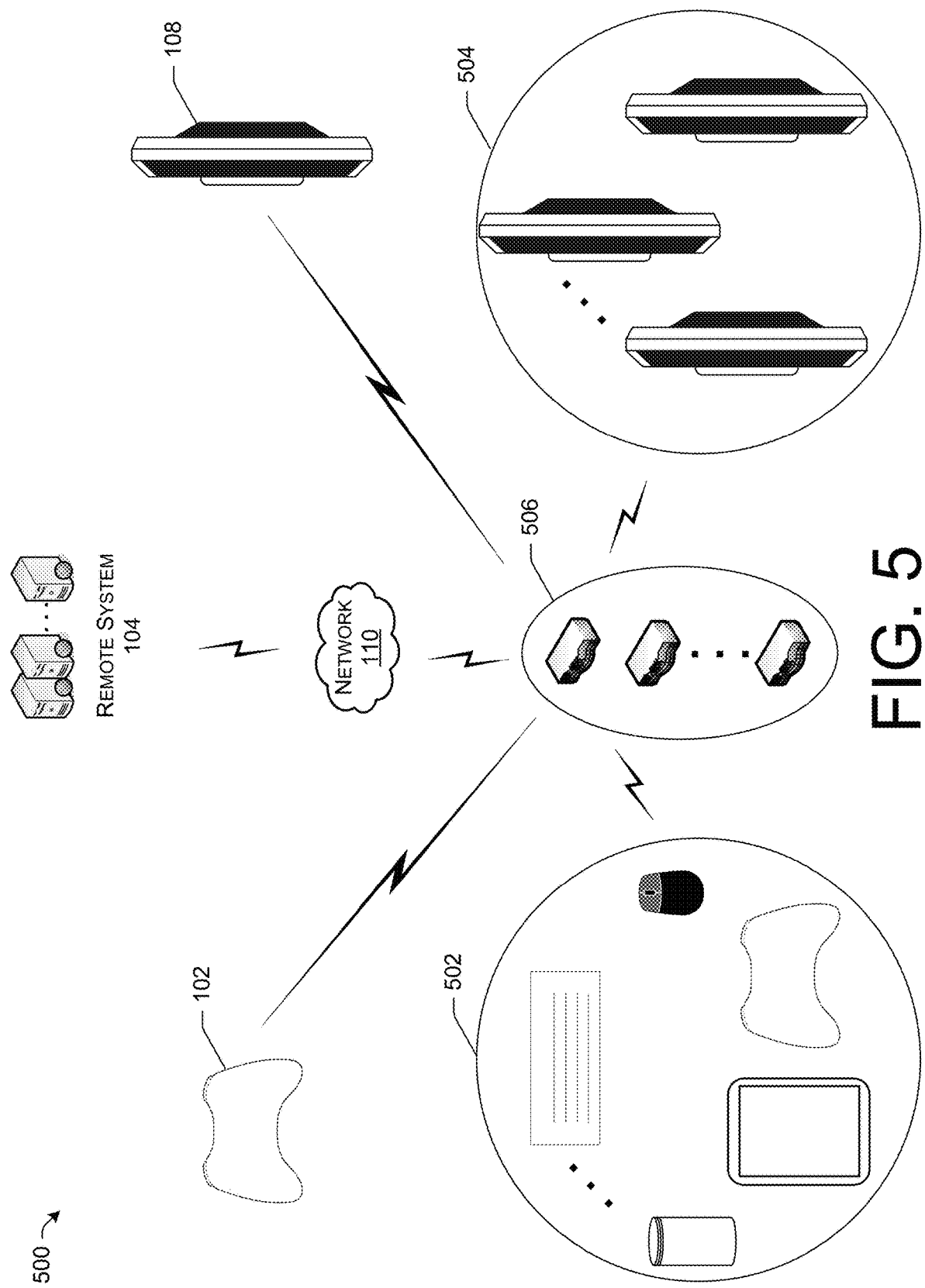
FIG. 5 illustrates a schematic diagram of an example system for communicating with multiple electronic devices and/or display devices in a network, according to various examples of the present disclosure.

FIG. 5 illustrates a schematic diagram of an example system 500 for communicating with multiple electronic devices and display devices in a network, according to various examples of the present disclosure. The system 500 may include, for example, the electronic device 102, the remote system 104, the display device 108, additional electronic device(s) 502(which may be similar to the electronic device 102), additional display device(s) 504 (which may be similar to the display device 108), and network device(s) 506 (which may include the network device 106). In the example of FIG. 5, the electronic device 102 and one or more of the additional electronic device(s) 504 be controlling an application provided by the remote system 104.

For example, the remote system 104 may receive, over the network 110, input data from the electronic device 102 and the one or more additional electronic device(s) 502. The remote system 104 may then update, using the input data, a state of an application. Additionally, the remote system 104 may send, to the one or more access point(s) 506, video data, audio data, and/or timestamp data that represents the state of the application. The audio data and/or the timestamp data may include first audio data and first timestamp data associated with the electronic device 102, second audio data and second timestamp data associated with a first additional electronic device 502, third audio data and third timestamp data associated with a second additional electronic device 502, and/or the like. The one or more network device(s) 506 may then send the video data to the display device 108, as well as send the audio data and the timestamp data to the electronic devices 102 and the one or more additional electronic device(s) 502.

In some instances, the one or more additional electronic device(s) 502 may be performing similar processes as described herein with respect to the electronic device 102 in order to switch between the first mode and the second mode. Additionally, the one or more network device(s) 506 may send the audio data and the timestamp data to the one or more additional electronic device(s) 502 based on the current operating mode of the one or more additional electronic device(s) 502, using the techniques described herein. In some instances, the electronic device 102 and the one or more additional electronic device(s) 502 may transition between the first mode and the second mode at similar time periods. Additionally, or alternatively, in some instances, the electronic device 102 and the one or more additional electronic device(s) 502 may transition between the first mode and the second mode at different time periods.

In some instances, such as when a user associated with the electronic device 102 is playing a network application, such as a network gaming application, one or more of the additional electronic device(s) 502, one or more of the additional display device(s) 504, and one or more of the network device(s) 506 may be located remotely from the user. However, the one or more additional electronic device(s) 502, the one or more additional display device(s) 504, the one or more network device(s) 506, and the remote system 104 may perform the techniques described herein to conserve power on the one or more additional electronic devices 502.

In some instances, such as when the application includes a gaming application, the remote system 104 may store an authoritative version of the environment of the game. The remote system 104 may then use the input data from the electronic devices 102 and 502 to update the positions of objects (e.g., characters, vehicles, buildings, etc.) within the environment. As such, the data representing a local state of the application that is associated with an electronic device, such as the electronic device 102, may represent the position(s) of object(s) that are controlled by the electronic device. The remote system 104 sends this data to the network device(s) 506 that are associated with the electronic device.

For example, a first local state of the application associated with the electronic device 102 may be different than a second local state of the application associated with an additional electronic device 502. For example, such as during a multiplayer network game, the first local state of the application associated with the electronic device 102 may represent a first position of a first object within a gaming environment, where the electronic device 102 is configured to control the first object. As such, the display device 108 may be displaying image(s) that represent the first local state of the application. Additionally, the second local state of the application associated with the additional electronic device 502 may represent a second position of a second object within the gaming environment, where the additional electronic device 502 is configured to control the second object. As such, an additional display device 504 (and/or the display device 108) may be displaying image(s) that represent the second local state of the application.

In such instances, when the remote system 104 updates the second local state of the application associated with the additional electronic device 504, such as by changing the position of the second object within the gaming environment, the remote system 104 may further update the first local state of the application to include the updated position of the second object. As such, the first local state of the application may represent both the first position of the first object and the updated position of the second object.

In some instances, the electronic device 102 may be associated with both the display device 108 and one or more of the additional display devices 504. For example, as the remote system 104 is receiving the input data from the electronic device 102 and updating the state of an application using the input data, the remote system 104 may be sending, over the network 110, data (e.g., video data, audio data, timestamp data, etc.) to the display device 106 and at least one additional display device 504 via one or more of the network device(s) 506. In some instances, the data sent to the display device 108 may be the same as the data that is sent to the additional display device 504. For example, the display device 108 and the additional display device 504 may be displaying similar content (e.g., image(s) representing a state of the application). Additionally, the display device 108 and the additional display device 504 may be receiving similar timestamp data that causes the display device 108 and the additional display device 504 to synchronize displaying of the content.

In some instances, the data sent to the display device 108 may be different than the data that is sent to the additional display device 504. For example, the display device 108 and the additional display device 504 may operate as a "split-screen" where the display device 108 displays a first portion of the content and the additional display device 504 displays a second portion of the content. Additionally, the display device 108 and the additional display device 504 may be receiving similar timestamp data that causes the display device 108 and the additional display device 504 to synchronize displaying of the content.

In some instances, the electronic device 102 and one or more of the additional electronic device(s) 502 may be associated with the display device 108. For example, a first user may be using the electronic device 102 to control the application while a second user is using an additional control device 502 to control the application. For instance, the remote system 104 may be receiving, over the network 110 and from one or more of the network device(s) 506, data (e.g., input data) from each of the electronic device 102 and the additional electronic device 502. The remote system 104 may then update the state of the application using the data that is received from each of the electronic device 102 and the additional electronic device 502. Additionally, the remote system 104 may be sending, over the network 110, data (e.g., video data, audio data, timestamp data, etc.) to the display device 108 via the one or more network device(s) 506, where the data represents the current state of the application.

In some instances, and in each of the examples described above, the electronic device 102 and one or more of the additional electronic devices 502 may be located in the same environment and/or the display device 108 and/or one or more of the additional display devices 504 may be located in the same environment. In some instances, and in each of the examples described above, the electronic device 102 and one or more of the additional electronic devices 502 may be located in separate environments and/or the display device 106 and/or one or more of the additional display devices 504 may be located in separate environments.

FIGS. 6A-9 illustrate various processes for conserving power on the electronic device 102. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 6A:
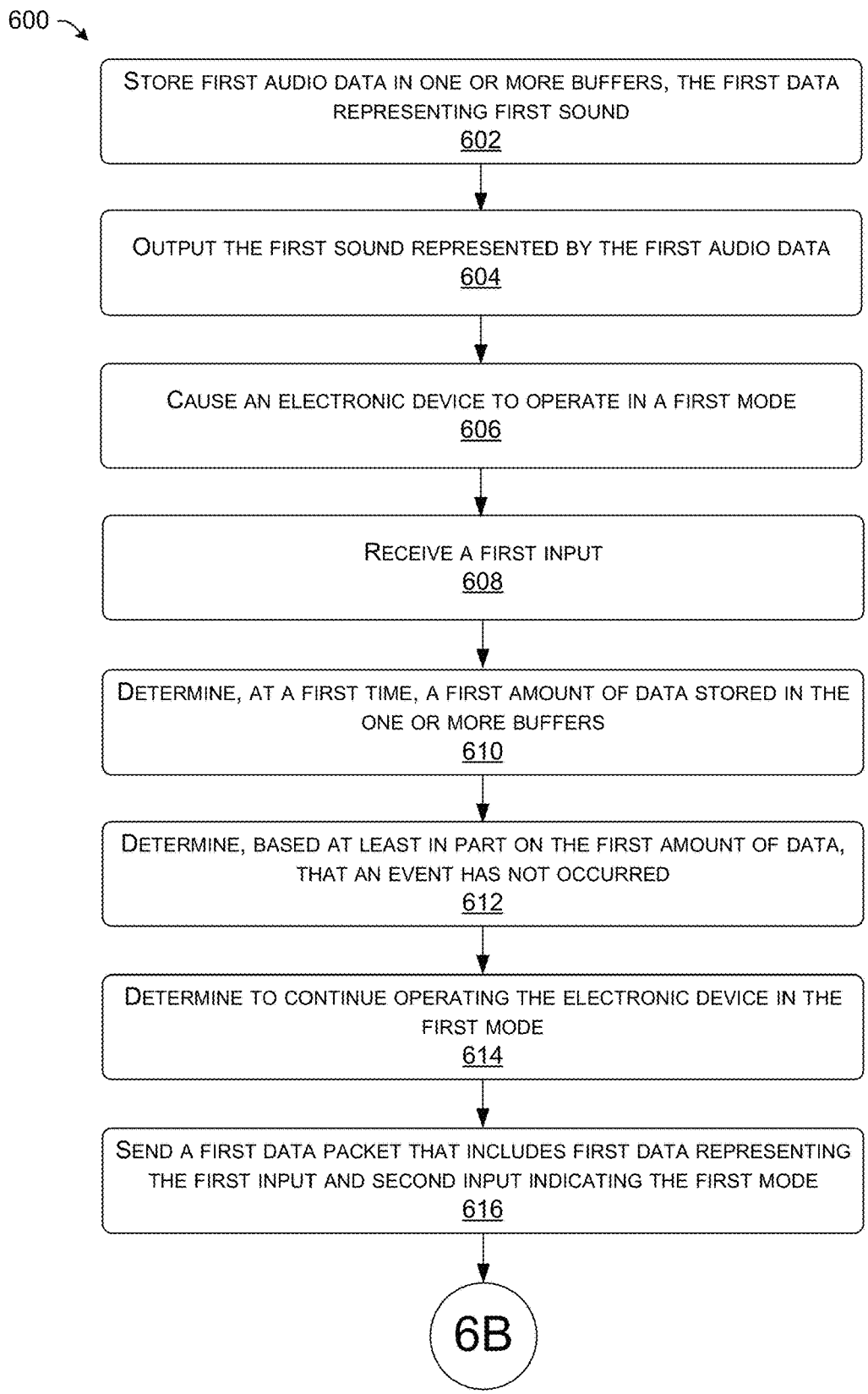
FIGS. 6A-6B illustrate an example process for conserving power on an electronic device, according to various examples of the present disclosure.
Figure 6B:
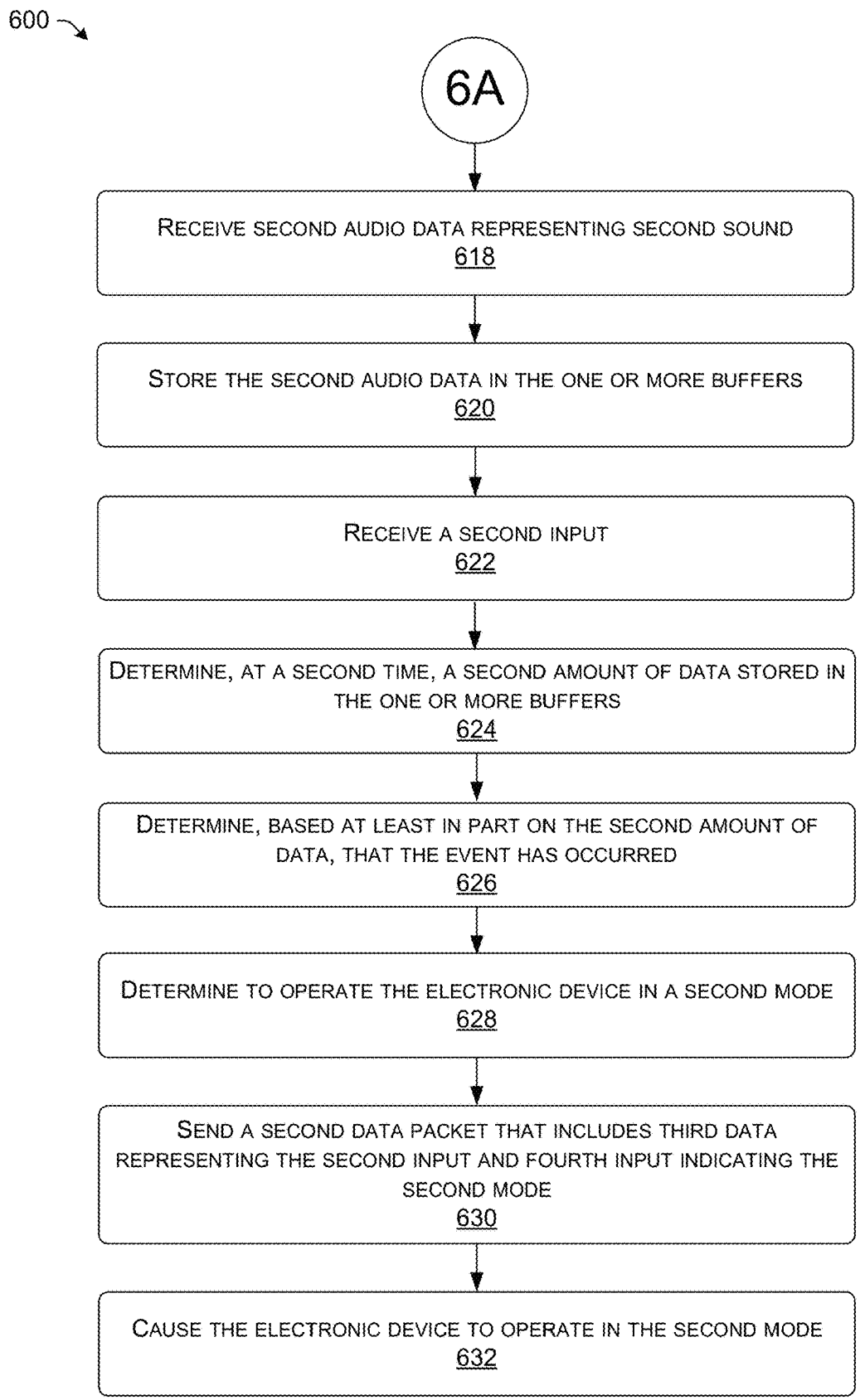

FIGS. 6A-6B illustrate an example process 600 for conserving power on an electronic device, according to various examples of the present disclosure. At 602, the process 600 may include storing first audio data in one or more buffers, the first data representing first sound. For instance, the electronic device 102 may store the first audio data in the one or more buffers after receiving the first audio data from the network device 106. The first audio data may be associated with first video data that the network device 106 sent to the display device 108. In some instances, the electronic device 102 may further store first timestamp data in the one or more buffers, where the first timestamp data is for synchronizing outputting of the first sound by the electronic device 102 with displaying of first content by the display device 108.

At 604, the process 600 may include outputting the first sound represented by the first audio data. For instance, the electronic device 102 may output, using one or more speakers, the first sound represented by the first audio data. In some instances, the electronic device uses the first timestamp data to output the first sound. For instance, the first timestamp data may represent timestamps indicating when to output various portions of the first sound.

At 606, the process 600 may include causing an electronic device to operate in a first mode. For instance, the electronic device 102 may begin operating in the first mode. In some instances, to operate in the first mode, the electronic device

102 may activate one or more components, such as one or more network interfaces, by providing power from one or more batteries to the one or more components. Although this is just one example of the electronic device 102 operating in the first mode, in other examples, the electronic device 102 may perform additional and/or alternatively processes to begin operating in the first mode.

At 608, the process 600 may include receiving a first input. For instance, the electronic device 102 may receive the first input. The first input may include, but is not limited to, first input(s) received using one or more input devices, first user speech received using one or more microphones, first motion captured using one or more imaging devices (e.g., one or more cameras), and/or the like. In some instances, the first input may be associated with updating a state of an application being controlled by the electronic device 102, such as a gaming application.

At 610, the process 600 may include determining, at a first time, a first amount of data stored in the one or more buffers. For instance, the electronic device 102 may determine the first amount of data stored in the one or more buffers. In some instances, the first amount of data may indicate the amount of the first audio data that the electronic device 102 has yet to process.

At 612, the process 600 may include determining, based at least in part on the first amount of data, that an event has not occurred. For instance, the electronic device 102 may determine that the event has not occurred based on the first amount of data. In some instances, the electronic device 102 may make the determination based on the first amount of data not satisfying a buffer threshold. In such instances, the buffer threshold may be based on an amount of data (e.g., one megabyte, five megabytes, ten megabytes, etc.) and/or the current capacity of the buffer(s) (e.g., fifty percent full, seventy-five percent full, ninety percent full, etc.). Additionally, or alternatively, in some instances, the electronic device 102 may make the determination based on a rate at which the amount of data stored in the buffer(s) is increasing or decreasing satisfying a rate threshold.

At 614, the process 600 may include determining to continue operating the electronic device in the first mode. For instance, based on determining that the event has not occurred, the electronic device 102 may determine to continue operating in the first mode. In some instances, the electronic device 102 makes the determination in order to receive additional data from the network device 106. For instance, the electronic device 102 may not be storing enough of the first audio data in the one or more buffers such that the electronic device 102 needs to receive additional audio data in order to continue outputting sound.

At 616, the process 600 may include sending a first data packet that includes first data representing the first input and second data indicating the first mode. For instance, the electronic device 102 may send the first data packet to the network device 106. In some instances, before sending the first data packet, the electronic device 102 determines that a given time interval has elapsed since sending a previous data packet to the network device 106. For instance, the electronic device 102 may be configured to send data packets to the network device 106 at the elapse of the given time intervals.

At 618, the process 600 may include receiving second audio data representing second sound. For instance, while continuing to operate in the first mode, the electronic device 102 may receive the second audio data from the network device 106. The second audio data may be associated with second video data that the network device 106 is sent to the display device 108. In some instances, the electronic device 102 may further receive second timestamp data that synchronizes outputting of the second sound by the electronic device 102 with displaying of second content by the display device 108.

At 620, the process 600 may include storing the second audio data in the one or more buffers. For instance, the electronic device 102 may store the second audio data in the one or more buffers. In some instances, the electronic device 102 may further store the second timestamp data in the one or more buffers.

At 622, the process 600 may include receiving a second input. For instance, the electronic device 102 may receive the second input. The second input may include, but is not limited to, second input(s) received using the one or more input devices, second user speech received using the one or more microphones, second motion captured using the one or more imaging devices (e.g., one or more cameras), and/or the like. In some instances, the second input may be associated with again updating the state of an application being controlled by the electronic device 102.

At 624, the process 600 may include determining, at a second time, a second amount of data stored in the one or more buffers. For instance, the electronic device 102 may determine the second amount of data stored in the one or more buffers. In some instances, the second amount of data may indicate the amount of the first audio data and/or the second audio data that the electronic device 102 has yet to process.

At 626, the process 600 may include determining, based at least in part on the second amount of data, that the event has occurred. For instance, the electronic device 102 may determine that the event has occurred based on the second amount of data. In some instances, the electronic device 102 may make the determination based on the second amount of data satisfying the buffer threshold. Additionally, or alternatively, in some instances, the electronic device 102 may make the determination based on a rate at which the amount of data stored in the buffer(s) is increasing or decreasing satisfying the rate threshold.

At 628, the process 600 may include determining to operate the electronic device in a second mode. For instance, based on determining that the event has occurred, the electronic device 102 may determine to operate in the second mode. In some instances, the electronic device 102 makes the determination since the electronic device 102 is storing enough of the second audio data in the one or more buffers that the electronic device 102 does not need to receive additional audio data in order to continue outputting sound.

At 630, the process 600 may include sending a second data packet that includes third data representing the second input and fourth data indicating the second mode. For instance, the electronic device 102 may send the second data packet to the network device 106. In some instances, before sending the second data packet, the electronic device 102 determines that the given time interval has elapsed since sending the first data packet to the network device 106.

At 632, the process 600 may include causing the electronic device to operate in the second mode. For instance, the electronic device 102 may begin operating in the second mode. In some instances, to operate in the second mode, the electronic device 102 may deactivate the one or more components, such as the one or more network interfaces, by ceasing from providing at least a portion of the power to the one or more components. Although this is just one example of the electronic device 102 operating in the second mode, in other examples, the electronic device 102 may perform additional and/or alternatively processes to begin operating in the second mode.

Figure 7:
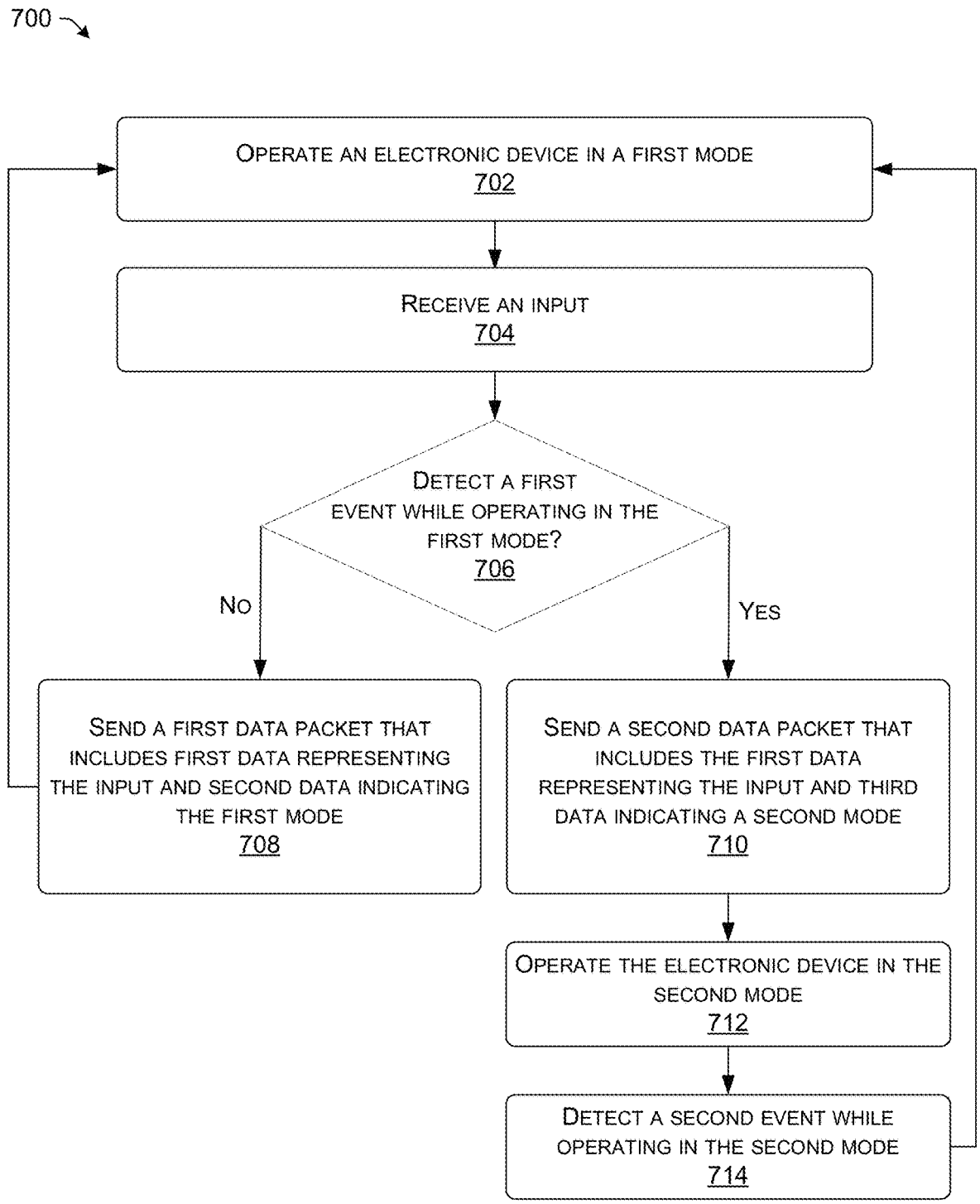
FIG. 7 illustrates an example process for conserving power on an electronic device based on detected events, according to various examples of the present disclosure.

FIG. 7 illustrates an example process 700 for conserving power on the electronic device 102 based on detected events, according to various examples of the present disclosure. At 702, the process 700 may include operating an electronic device in a first mode. For instance, the electronic device 102 may begin operating in the first mode. In some instances, to operate in the first mode, the electronic device 102 may activate one or more components, such as one or more network interfaces, by providing power from one or more batteries to the one or more components. Although this is just one example of the electronic device 102 operating in the first mode, in other examples, the electronic device 102 may perform additional and/or alternatively processes to begin operating in the first mode.

At 704, the process 700 may include receiving an input. For instance, the electronic device 102 may receive the input. The input may include, but is not limited to, input(s) received using one or more input devices, user speech received using one or more microphones, motion captured using one or more imaging devices (e.g., one or more cameras), and/or the like. In some instances, the input may be associated with updating a state of an application being controlled by the electronic device 102, such as a gaming application.

At 706, the process 700 may include determining whether a first event is detected while operating in the first mode. For instance, the electronic device 102 may determine whether the first event is detected while operating in the first mode. In some instances, the electronic device 102 may detect the first event when an amount of data stored in buffer(s) satisfies a buffer threshold, but not detect the first event when the amount of data does not satisfy the buffer threshold. In some instances, the electronic device 102 may detect the first event when the electronic device 102 does not receive data from the network device 107 for a threshold period of time, but not detect the first event when the electronic device 102 does receive the data.

In some instances, the electronic device 102 may detect the first event using one or more characteristics associated with a network connection between the electronic device 102 and the network device 107. A network condition may include, but is not limited to, a PER, a RSSI, a bit rate error, a wireless channel availability, a number of consecutive packet losses, a packet outage duration, packet arrival time, number of devices connected to the network(s), number of network(s) for which the electronic device is connected, and/or the like. For instance, the electronic device 102 may detect the first event when the PER satisfies a threshold PER, but not detect the first event when the PER does not satisfy a threshold PER. Additionally, or alternatively, the electronic device 102 may detect the first event when the RSSI does not satisfy a threshold RSSI, but not detect the first event when the RSSI satisfies a threshold RSSI.

Still, in some instances, the electronic device 102 may determine whether the first event is detected using data received from the network device 107. For a first example, the electronic device 102 may detect the first event when the electronic device 102 receives data indicating that the electronic device 102 may transition to the second mode, but not detect the first event when the electronic device 102 receives data indicating that the electronic device 102 should remain in the first mode. For a second example, the electronic device 102 may detect the first event when the electronic device 102 receives data indicating a period of time for which the electronic device may transition to the second mode.

If, at 706, the first event is not detected, then at 708, the process 700 may include sending a first data packet that includes first data representing the input and second data indicating the first mode. For instance, if the electronic device 102 does not detect the first event, then the electronic device 102 may send the first data packet to the network device 107. The first data packet may include the first data representing the input and the second data indicating the first mode. In some instances, the example process 700 of FIG. 7 may then repeat starting back at 702.

However, if, at 706, the first event is detected, then at 710, the process 700 may include sending a second data packet that includes the first data representing the input and third data indicating a second mode. For instance, if the electronic device 102 detects the first event, then the electronic device 102 may send the second data packet to the network device 107. The second data packet may include the first data representing the input and the third data indicating the second mode.

At 712, the process 700 may include operating the electronic device in the second mode. For instance, the electronic device 102 may begin operating in the second mode. In some instances, to operate in the second mode, the electronic device 102 may deactivate the one or more components, such as the one or more network interfaces, by ceasing from providing at least a portion of the power to the one or more components. Although this is just one example of the electronic device 102 operating in the second mode, in other examples, the electronic device 102 may perform additional and/or alternatively processes to begin operating in the second mode.

At 714, the process 700 may include detecting a second event while operating in the second mode. For instance, the electronic device 102 may detect the second event while operating in the second mode. In some instances, the electronic device 102 may detect the event by determining that a period of time elapses since transitioning to the second mode. In such instances, the electronic device 102 may the same period of time each time the electronic device 102 transitions to the second mode or the electronic device 102 may use a different period of time for one or more instances of transitioning to the second mode. Additionally, or alternatively, in some instances, the electronic device 102 may detect the event by determining that the electronic device 102 has received a threshold number of inputs while operating in the second mode. The threshold number of inputs may include, but is not limited to, one input, two inputs, five inputs, ten inputs, and/or the like. In either instance, based on detecting the second event, the example process 700 of FIG. 7 may repeat starting back at 702.

Figure 8:
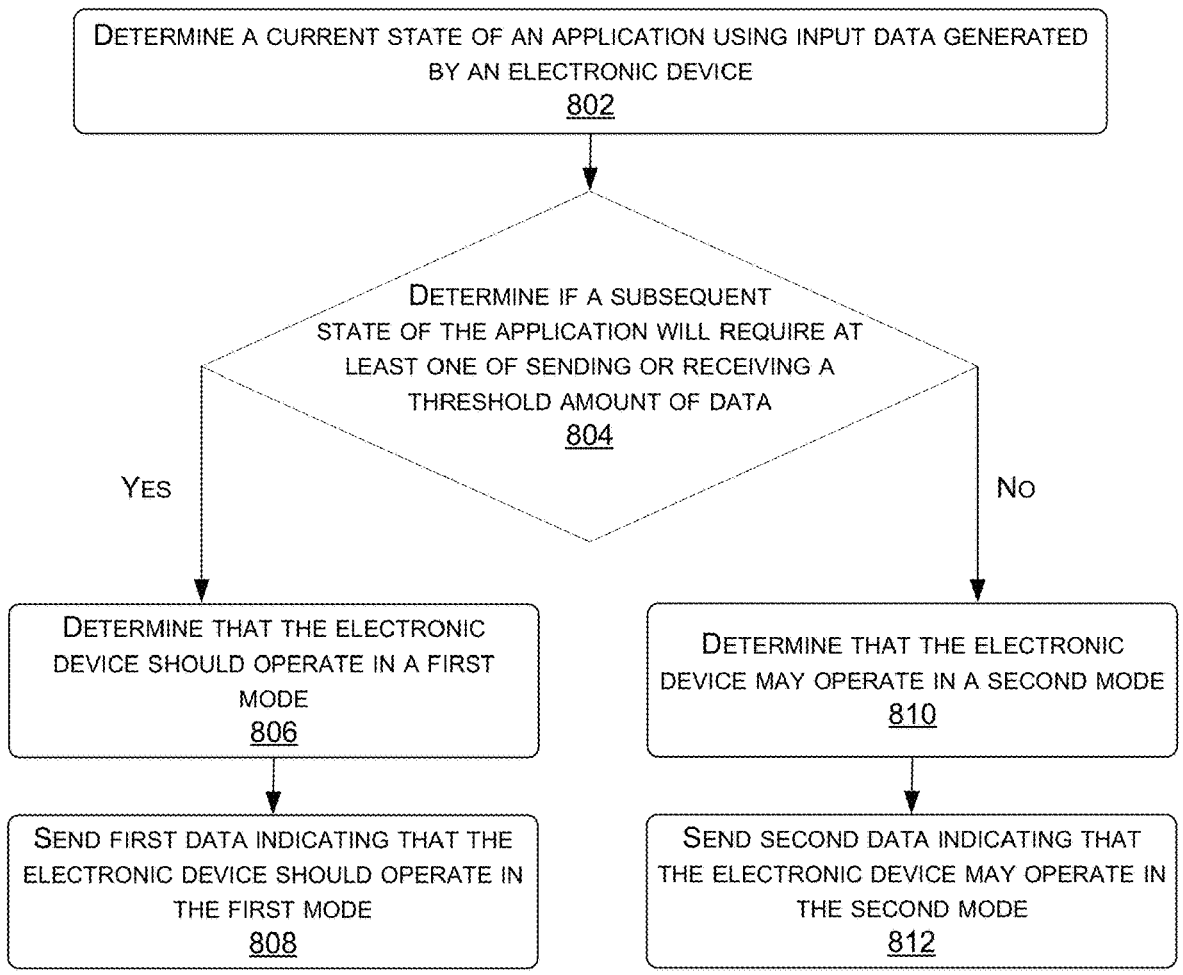
FIG. 8 illustrates an example process for determining a state of operation for an electronic device, according to various examples of the present disclosure.

FIG. 8 illustrates an example process 800 for determining a state of operation for the electronic device 102, according to various examples of the present disclosure. At 802, the process 800 may include determining a current state of an application using input data generated by an electronic device. For instance, the remote system 104 may determine the current state of the application using the input data. In some instances, the application may include a gaming application, where the remote system 104 uses at least the input data to continually update the state of the application.

At 804, the process 800 may include determining whether a subsequent state of the application will require at least one of sending or receiving a threshold amount of data. For instance, the remote system 104 may determine whether the subsequent state of the application will likely require the at least one of sending or receiving the threshold amount of data. In some instances, the remote system 104 may determine that the subsequent state of the application will likely require the at least one of sending or receiving the threshold amount of data when the subsequent state of the application will require multiple inputs from the electronic device 102, but determine that the subsequent state of the application will likely not require the at least one of sending or receiving the threshold amount of data when the subsequent state of the application will require few inputs from the electronic device 102.

In some instances, the remote system 104 may determine that the subsequent state of the application will likely require the at least one of sending or receiving the threshold amount of data when the subsequent state of the application will require the remote system 104 to send, to the electronic device 102 and/or the display device 108, data (e.g., audio data, video data, timestamp data, etc.) representing multiple updates to the application. Additionally, the remote system 104 may determine that the subsequent state of the application will likely not require the at least one of sending or receiving the threshold amount of data when the subsequent state of the application will not require the remote system 104 to send, to the electronic device 102 and/or the display device 108, data representing multiple updates to the application.

If, at 804, it is determined that the subsequent state of the application will require the at least one of sending or receiving the threshold amount of data, then at 806, the process 800 may include determining that the electronic device should operate in a first mode. For instance, if the remote system 104 determines that the subsequent state of the application will require the at least one of sending or receiving the threshold amount of data, the remote system 104 may determine that the electronic device 102 should operate in the first mode. In some instances, the electronic device 102 is able to send and/or receive data when operating in the first mode.

At 808, the process 800 may include sending first data indicating that the electronic device should operate in the first mode. For instances, the remote system 104 may send, to the network device 106, the first data indicating that the electronic device 102 should operate in the first mode. In some instances, the example process 800 of FIG. 8 may then repeat back at 802.

However, if, at 804, it is determined that the subsequent state of the application will not require the at least one of sending or receiving the threshold amount of data, then at 812, the process 800 may include determining that the electronic device may operate in a second mode. For instance, if the remote system 104 determines that the subsequent state of the application will not require the at least one of sending or receiving the threshold amount of data, the remote system 104 may determine that the electronic device 102 may operate in the second mode. In some instances, the electronic device 102 is not able to send and/or receive data when operating in the second mode.

At 814, the process 800 may include sending second data indicating that the electronic device may operate in the second mode. For instances, the remote system 104 may send, to the network device 106, the second data indicating that the electronic device 102 may operate in the second mode. In some instances, the example process 800 of FIG. 8 may then repeat back at 802.

Figure 9:
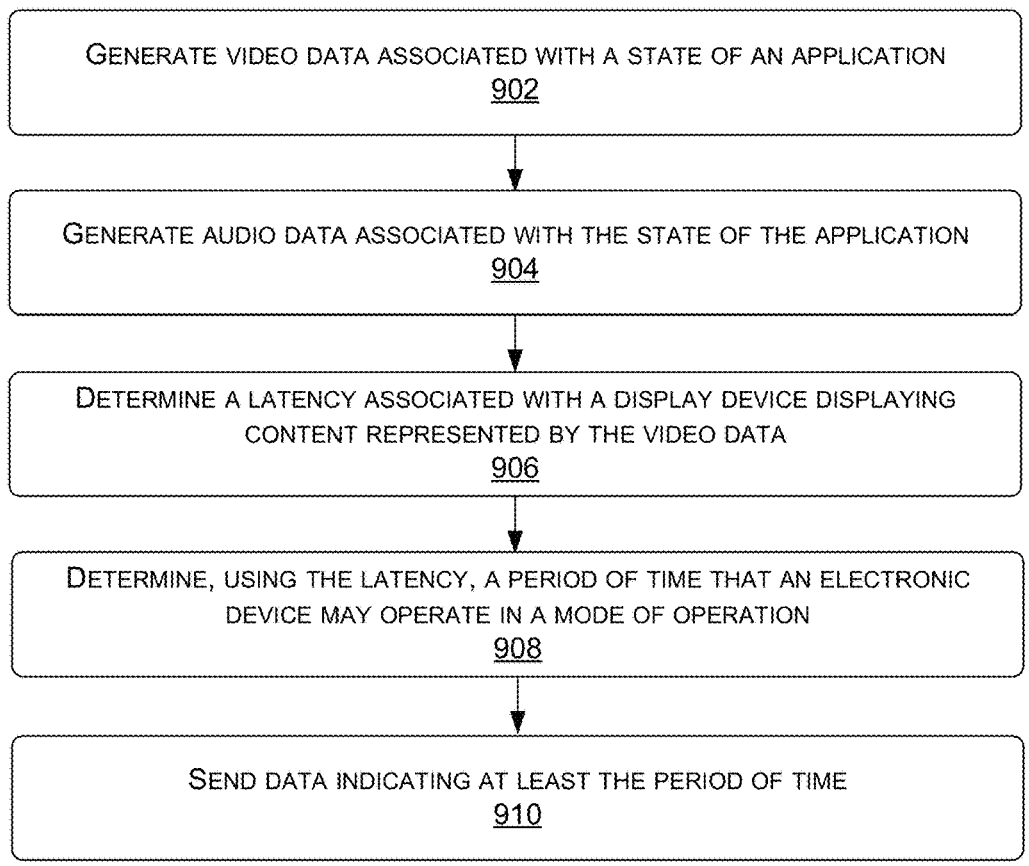
FIG. 9 illustrates an example process of a remote system determining a period of time for which an electronic device may operate in a mode of operation, according to various examples of the present disclosure.

FIG. 9 illustrates an example process 900 of the remote system 104 determining a period of time for which the electronic device 102 may operate in a mode of operation, according to various examples of the present disclosure. At 902, the process 900 may include generating video data associated with a state of an application. For instance, the remote system 104 may generate the video data associated with the state of the application. To determine the state of the application, the remote system 104 may use input data generated by the electronic device 102 that is controlling the application. For instance, the remote system 104 may continue to receive the input data and update the state of the application using the input data.

At 904, the process 900 may include generating audio data associated with the state of the application. For instance, the remote system 104 may generate the audio data associated with the state of the application. The remote system 104 may also generate timestamp data that synchronizes displaying content represented by the video data with outputting of sound represented by the audio data. Additionally, the remote system 104 may send the audio data and the video data to the network device 106.

At 906, the process 900 may include determining a latency associated with a display device displaying content represented by the video data. For instance, the remote system 104 may determine the latency. In some instances, the remote system 104 determines the latency based on a rate at which the remote system 104 is sending the video data to the network device 106. In some instances, the remote system 104 determines the latency based on data received from the network device 106. For instance, the data may indicate the latency and/or the data may indicate the rate at which the network device 106 is sending the video data to the display device 109.

At 908, the process 900 may include determining, using the latency, a period of time that an electronic device may operate in a mode of operation. For instance, the remote system 104 may use the latency to determine the period of time. In some instance, to determine the period of time, the remote system 104 may determine the period of time as including the latency. In some instances, to determine the period of time, the remote system 104 may determine that the latency is greater than the given time interval for which the electronic device 102 sends and/or receives data. As such, the remote system 104 may determine that the electronic device 102 is able to transition to the mode of operation for a greater time interval, where the period of time is associated with the greater time interval.

At 910, the process 900 may include sending data indicating at least the period of time. For instance, the remote system 104 may send the data to the network device 106, which may then send additional data indicating the period of time to the electronic device 102. In some instances, the remote system 104 may continue to perform the example process 900 of FIG. 9 in order to update the period of time as the latency changes.

While the foregoing invention is described with respect to the specific examples, it is to be understood that the scope of the invention is not limited to these specific examples. Since other modifications and changes varied to fit particular requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A remote system comprising:
one or more processors; and
one or more computer-readable media storing instructions that, when executed by the one or more processors, cause the one or more processors to perform operations comprising:
determining a first state of a game describing first conditions within the game;
receiving, from a network device, first data representing an input received by a game controller;
determining a second state of the game describing second conditions within the game based at least in part on the first state of the game and the first data, wherein the second state of the game is different from the first state based at least in part on the input and the first data;
sending, to the network device, second data for a display device, the second data representing the second state of the game;
determining an amount of data representing a third state of the game that is to be sent to the game controller or received from the game controller so that the third state of the game can occur after the second state of the game;
determining that the game controller should operate in a mode comprising one of a first mode or a second mode based at least in part on the amount of data, by:
determining that the game controller should operate in the first mode in response to the amount of data being at or above a threshold amount of data; and
determining that the game controller should operate in the second mode in response to the amount of data being below the threshold amount of data; and
sending, to the network device, third data that causes the game controller to operate in the mode.

2. The system as recited in claim 1, the operations further comprising:
receiving, from the network device, a request to establish a first wireless connection with the game controller;
establishing the first wireless connection with the game controller via the network device;
determining that the game controller is associated with the display device; and
establishing a second wireless connection with the display device via the network device.

3. The system as recited in claim 1, the operations further comprising:
determining that the amount of data satisfies a threshold amount,
wherein the mode includes an active mode of the game controller.

4. The system as recited in claim 1, the operations further comprising:
determining that the amount of data does not satisfy a threshold amount; and
wherein the mode includes a deactivated mode of the game controller.

5. The system as recited in claim 1, wherein:
determining the amount of data comprises determining that the third state of the game, that is to occur after the second state of the game, is associated with receiving a number of inputs from the game controller; and determining that the game controller should operate in the mode is based at least in part on the number of inputs.

6. The system as recited in claim 1, wherein:
determining the amount of data comprises determining that the third state of the game, that is to occur after the second state of the game, is associated with sending a number of updates to the game controller; and
determining that the game controller should operate in the mode is based at least in part on the number of updates.

7. The system as recited in claim 1, wherein the mode is a first mode, and wherein the operations further comprise:
determining that the game controller should operate in a second mode, wherein the first mode is associated with activating one or more components of the game controller and the second mode is associated with deactivating the one or more components; and
sending, to the network device, fourth data that causes the game controller to operate in the second mode.

8. The system as recited in claim 1, the operations further comprising:
determining a period of time that the game controller should operate in the mode,
wherein the third data represents the period of time.

9. A method comprising:
receiving a request to establish a first wireless connection with a game controller;
based at least in part on the first request, establishing the first wireless connection with the game controller;
establishing a second wireless connection with a display device;
determining a first state of a game associated with first conditions within the game;
receiving, using the first wireless connection, first data representing an input received by the game controller;
determining a second state of the game describing second conditions within the game based at least in part on the first state of the game and the first data, wherein the second state of the game is different from the first state in response to the first data;
sending, using the second wireless connection and to the display device, second data representing the second state of the game;
determining an amount of data representing a third state of the game that is to be sent to the game controller or received from the game controller so that the third state of the game can occur after the second state of the game;
determining that the game controller should operate in a mode comprising one of a first mode or a second mode based at least in part on the amount of data by:
determining that the game controller should operate in the first mode in response to the amount of data being at or above a threshold amount of data; and
determining that the game controller should operate in the second mode in response to the amount of data being below the threshold amount of data; and
sending, using the first wireless connection, third data that causes the game controller to operate in the mode.

10. The method as recited in claim 9, further comprising:
storing first identifier data associated with the game controller;
storing second identifier data associated with the display device; and
based at least in part on receiving the request, determining that the game controller is associated with the display device using the first identifier data and the second identifier data, wherein establishing the second wireless connection is based at least in part on the game controller being associated with the display device.

11. The method as recited in claim 9, further comprising:
determining that the amount of data satisfies a threshold amount,
wherein the mode includes an active mode of the game controller.

12. The method as recited in claim 9, further comprising:
determining that the amount of data does not satisfy a threshold amount; and
wherein the mode includes a deactivated mode of the game controller.

13. The method as recited in claim 9, wherein:
determining the amount of data comprises determining that the third state of the game, that is to occur after the second state of the game, is associated with receiving a number of inputs from the game controller; and
determining that the game controller should operate in the mode is based at least in part on the number of inputs.

14. The method as recited in claim 9, wherein:
determining the amount of data comprises determining that the third state of the game, that is to occur after the second state of the game, is associated with sending a number of updates to the game controller; and
determining that the game controller should operate in the mode is based at least in part on the number of updates.

15. The method as recited in claim 9, wherein the mode is a first mode, and wherein the method further comprises:
determining that the game controller should operate in a second mode, wherein the first mode is associated with activating one or more components of the game controller and the second mode is associated with deactivating the one or more components; and
sending, using the first wireless connection, fourth data that causes the game controller to operate in the second mode.

16. The method as recited in claim 9, further comprising:
determining a period of time that the game controller should operate in the mode,
wherein the third data represents the period of time.

17. A system comprising:
one or more processors; and
one or more computer-readable media storing instructions that, when executed by the one or more processors, cause the one or more processors to perform operations comprising:
sending, to a network device, first data for a display device, the first data representing a first state of a game;
sending, to the network device, second data for a game controller, the second data representing the first state of the game;
receiving, from the network device, third data representing an input received by the game controller;
determining a second state of the game based at least in part on the first state of the game and the third data;
sending, to the network device, fourth data for the display device, the fourth data representing the second state of the game;
receiving, from the network device, fifth data indicating that the game controller is operating in a first mode or a second mode;
determining an amount of data representing a third state of the game that is to be sent to the game controller or received from the game controller so that the third state of the game can occur after the second state of the game;
determining a mode transition for the game controller between the first mode and the second mode based at least in part on the amount of data, by:
determining that the game controller should operate in the first mode in response to the amount of data being at or above a threshold amount of data; and
determining that the game controller should operate in the second mode in response to the amount of data being below the threshold amount of data; and
based at least in part on the fifth data and the mode transition:
refraining from sending, to the network device, sixth data for the game controller when the mode transition corresponds with the fifth data; and
sending, to the network device, the sixth data for the game controller when the mode transition differs from the fifth data.

18. The system as recited in claim 17, the operations further comprising:
receiving, from the network device, a request to establish a first wireless connection with the game controller;
establishing the first wireless connection with the game controller via the network device;
determining that the game controller is associated with the display device; and
establishing a second wireless connection with the display device via the network device.

19. The system as recited in claim 17, the operations further comprising:
receiving seventh data indicating that the game controller is operating in a second mode; and
based at least in part on the seventh data, sending, the sixth data to the network device, the sixth data representing the second state of the game.

20. The system as recited in claim 19, wherein:
the first mode is associated with activating one or more components of the game controller; and
the second mode is associated with deactivating the one or more components.

\* \* \* \* \*